(12) United States Patent
Elshafie et al.

(10) Patent No.: US 12,004,167 B2
(45) Date of Patent: Jun. 4, 2024

(54) MULTI-STAGE DOWNLINK CONTROL INFORMATION FOR DOWNLINK TRANSMISSIONS

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 17/204,805

(22) Filed: Mar. 17, 2021

(65) Prior Publication Data

US 2022/0303957 A1    Sep. 22, 2022

(51) Int. Cl.
*H04W 72/23* (2023.01)
*H04L 5/00* (2006.01)
*H04W 72/21* (2023.01)

(52) U.S. Cl.
CPC ........... *H04W 72/23* (2023.01); *H04L 5/0048* (2013.01); *H04W 72/21* (2023.01)

(58) Field of Classification Search
CPC ...... H04W 72/23; H04W 72/21; H04L 5/0048
USPC ........................................................ 370/329
See application file for complete search history.

(56) References Cited

U.S. PATENT DOCUMENTS

| 2013/0155914 | A1* | 6/2013 | Wang | H04L 5/001 370/280 |
| 2015/0016376 | A1* | 1/2015 | Seo | H04L 5/0048 370/329 |
| 2017/0171841 | A1* | 6/2017 | Chen | H04L 1/1812 |
| 2018/0027541 | A1* | 1/2018 | Wu | H04L 5/0055 370/329 |
| 2018/0199268 | A1* | 7/2018 | Wang | H04L 5/0053 |
| 2020/0295903 | A1* | 9/2020 | Faxér | H04W 24/10 |

* cited by examiner

*Primary Examiner* — Chi Tang P Cheng
(74) *Attorney, Agent, or Firm* — Holland & Hart / Qualcomm

(57) ABSTRACT

Methods, systems, and devices for wireless communication are described. A user equipment (UE) may receive a first downlink control information (DCI) message from a base station on a first downlink control channel. The first DCI message may indicate a first set of transmission parameters. The UE may transmit a first uplink control information (UCI) message to the base station on an uplink control channel based on the first DCI message. The first UCI message may include feedback and a channel state information (CSI) report. The UE may receive a second DCI message from the base station on a second downlink channel based on the first UCI message. The second DCI message may indicate a second set of transmission parameters that are different than the first set of transmission parameters. The UE may communicate with the base station using the second set of transmission parameters indicated by the second DCI message.

26 Claims, 17 Drawing Sheets

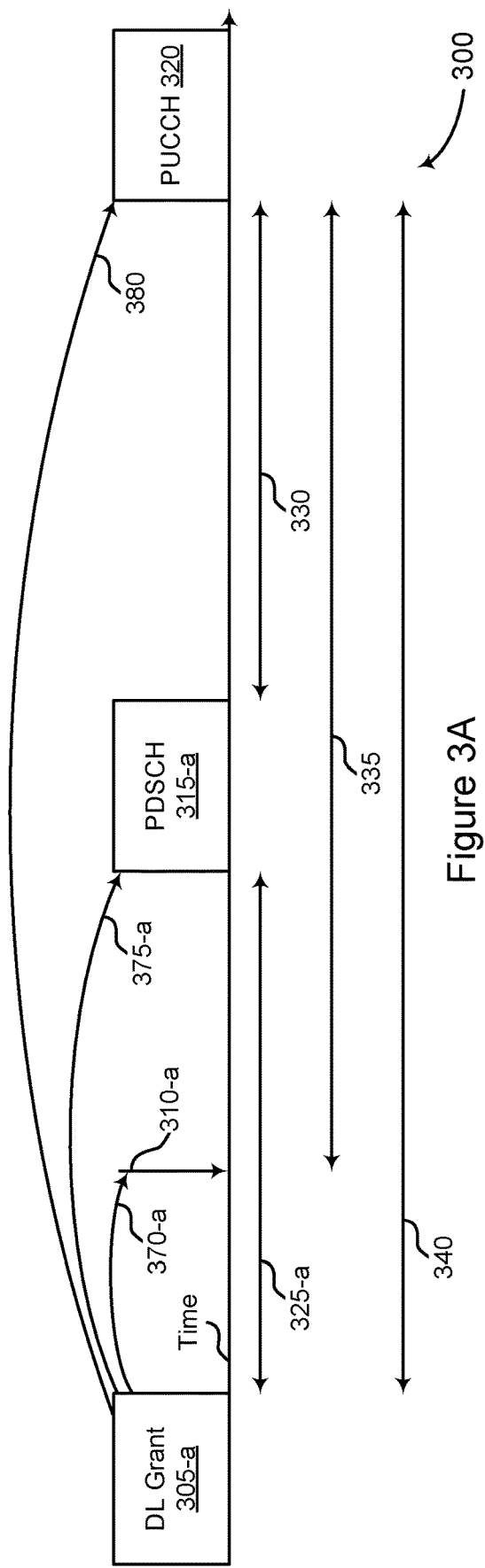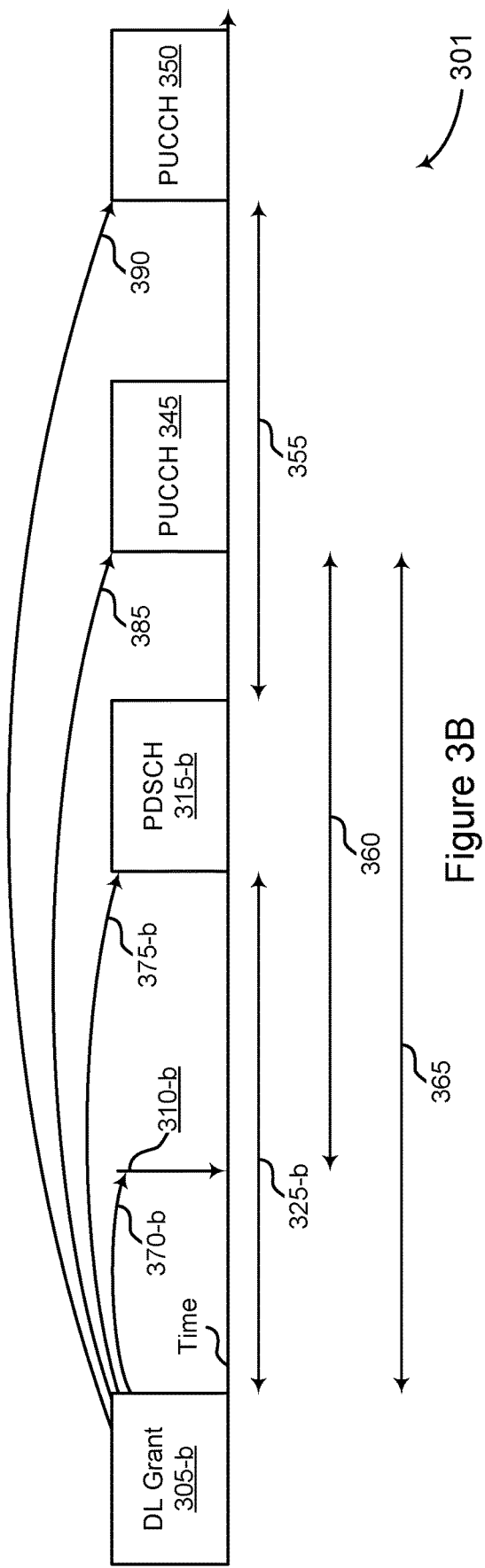

MULTI-STAGE DOWNLINK CONTROL INFORMATION FOR DOWNLINK TRANSMISSIONS

TECHNICAL FIELD

The following relates to wireless communication, including multi-stage downlink control information (DCI) for downlink transmissions.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access communications systems include fourth generation (4G) systems such as Long Term Evolution (LTE) systems, LTE-Advanced (LTE-A) systems, or LTE-A Pro systems, and fifth generation (5G) systems, which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipments (UEs). Some wireless communications systems may provide for a base station scheduling a UE to transmit a channel state information (CSI) report to the base station. In some cases, the base station may transmit an uplink grant to the UE. The uplink grant may schedule uplink resources for the UE to transmit the CSI report. In such cases, the UE may transmit the CSI report to the base station on a physical uplink shared channel (PUSCH). Additionally or alternatively, the base station may transmit a downlink grant to the UE, in which the downlink grant triggers the UE to transmit the CSI report on a physical uplink control channel (PUCCH).

SUMMARY

One innovative aspect of the subject matter described in this disclosure can be implemented in a method for wireless communication at a user equipment (UE). The method may include receiving a first downlink control information (DCI) message on a first downlink control channel, the first DCI message including a first set of transmission parameters, transmitting a first uplink control information (UCI) message on a first uplink control channel based on the first DCI message, the first UCI message including a first feedback and a first channel state information (CSI) report, receiving a second DCI message on a second downlink control channel based on the first UCI message, the second DCI message including a second set of transmission parameters different than the first set of transmission parameters, and communicating with a base station using the second set of transmission parameters.

Another innovative aspect of the subject matter described in this disclosure can be implemented in an apparatus for wireless communication at a UE. The apparatus may include a processor, memory coupled with the processor, and instructions stored in the memory. The instructions may be executable by the processor to cause the apparatus to receive a first DCI message on a first downlink control channel, the first DCI message including a first set of transmission parameters, transmit a first UCI message on a first uplink control channel based on the first DCI message, the first UCI message including a first feedback and a first CSI report, receive a second DCI message on a second downlink control channel based on the first UCI message, the second DCI message including a second set of transmission parameters different than the first set of transmission parameters, and communicate with a base station using the second set of transmission parameters.

Another innovative aspect of the subject matter described in this disclosure can be implemented in another apparatus for wireless communication at a UE. The apparatus may include means for receiving a first DCI message on a first downlink control channel, the first DCI message including a first set of transmission parameters, means for transmitting a first UCI message on a first uplink control channel based on the first DCI message, the first UCI message including a first feedback and a first CSI report, means for receiving a second DCI message on a second downlink control channel based on the first UCI message, the second DCI message including a second set of transmission parameters different than the first set of transmission parameters, and means for communicating with a base station using the second set of transmission parameters.

Another innovative aspect of the subject matter described in this disclosure can be implemented in a non-transitory computer-readable medium storing code for wireless communication at a UE. The code may include instructions executable by a processor to receive a first DCI message on a first downlink control channel, the first DCI message including a first set of transmission parameters, transmit a first UCI message on a first uplink control channel based on the first DCI message, the first UCI message including a first feedback and a first CSI report, receive a second DCI message on a second downlink control channel based on the first UCI message, the second DCI message including a second set of transmission parameters different than the first set of transmission parameters, and communicate with a base station using the second set of transmission parameters.

Some examples of the method, apparatuses, and non-transitory computer-readable medium described herein may further include operations, features, means, or instructions for transmitting a second UCI message on a second uplink control channel, the second UCI message including one or more of a second feedback or a second CSI report, where communicating with the base station may be based on the second UCI message.

Some examples of the method, apparatuses, and non-transitory computer-readable medium described herein may further include operations, features, means, or instructions for transmitting the second UCI message including one or more of the second feedback or the second CSI report based on a CSI report field in the second DCI message indicating that CSI reporting may be enabled.

One innovative aspect of the subject matter described in this disclosure can be implemented in a method for wireless communication at a base station. The method may include transmitting a first DCI message on a first downlink control channel, the first DCI message including a first set of transmission parameters, receiving a first UCI message on a first uplink control channel based on the first DCI message, the first UCI message including a first feedback and a first CSI report, transmitting a second DCI message on a second downlink control channel based on the first UCI message, the second DCI message including a second set of transmission parameters different than the first set of transmission parameters, and communicating with a UE based on the second set of transmission parameters.

Another innovative aspect of the subject matter described in this disclosure can be implemented in an apparatus for wireless communication at a base station. The apparatus may include a processor, memory coupled with the processor, and instructions stored in the memory. The instructions may be executable by the processor to cause the apparatus to transmit a first DCI message on a first downlink control channel, the first DCI message including a first set of transmission parameters, receive a first UCI message on a first uplink control channel based on the first DCI message, the first UCI message including a first feedback and a first CSI report, transmit a second DCI message on a second downlink control channel based on the first UCI message, the second DCI message including a second set of transmission parameters different than the first set of transmission parameters, and communicate with a UE based on the second set of transmission parameters.

Another innovative aspect of the subject matter described in this disclosure can be implemented in another apparatus for wireless communication at a base station. The apparatus may include means for transmitting a first DCI message on a first downlink control channel, the first DCI message including a first set of transmission parameters, means for receiving a first UCI message on a first uplink control channel based on the first DCI message, the first UCI message including a first feedback and a first CSI report, means for transmitting a second DCI message on a second downlink control channel based on the first UCI message, the second DCI message including a second set of transmission parameters different than the first set of transmission parameters, and means for communicating with a UE based on the second set of transmission parameters.

Another innovative aspect of the subject matter described in this disclosure can be implemented in a non-transitory computer-readable medium storing code for wireless communication at a base station. The code may include instructions executable by a processor to transmit a first DCI message on a first downlink control channel, the first DCI message including a first set of transmission parameters, receive a first UCI message on a first uplink control channel based on the first DCI message, the first UCI message including a first feedback and a first CSI report, transmit a second DCI message on a second downlink control channel based on the first UCI message, the second DCI message including a second set of transmission parameters different than the first set of transmission parameters, and communicate with a UE based on the second set of transmission parameters.

Some examples of the method, apparatuses, and non-transitory computer-readable medium described herein may further include operations, features, means, or instructions for receiving a second UCI message on a second uplink control channel, the second UCI message including one or more of a second feedback or a second CSI report, where communicating with the UE may be based on the second UCI message.

Some examples of the method, apparatuses, and non-transitory computer-readable medium described herein may further include operations, features, means, or instructions for receiving the second UCI message including one or more of the second feedback or the second CSI report based on a CSI report field in the second DCI message indicating that CSI reporting may be enabled.

BRIEF DESCRIPTION OF THE DRAWINGS

FIGS. 3A and 3B illustrate examples of transmission schedules that support multi-stage DCI for downlink transmissions in accordance with aspects of the present disclosure.

DETAILED DESCRIPTION

Figure 1:
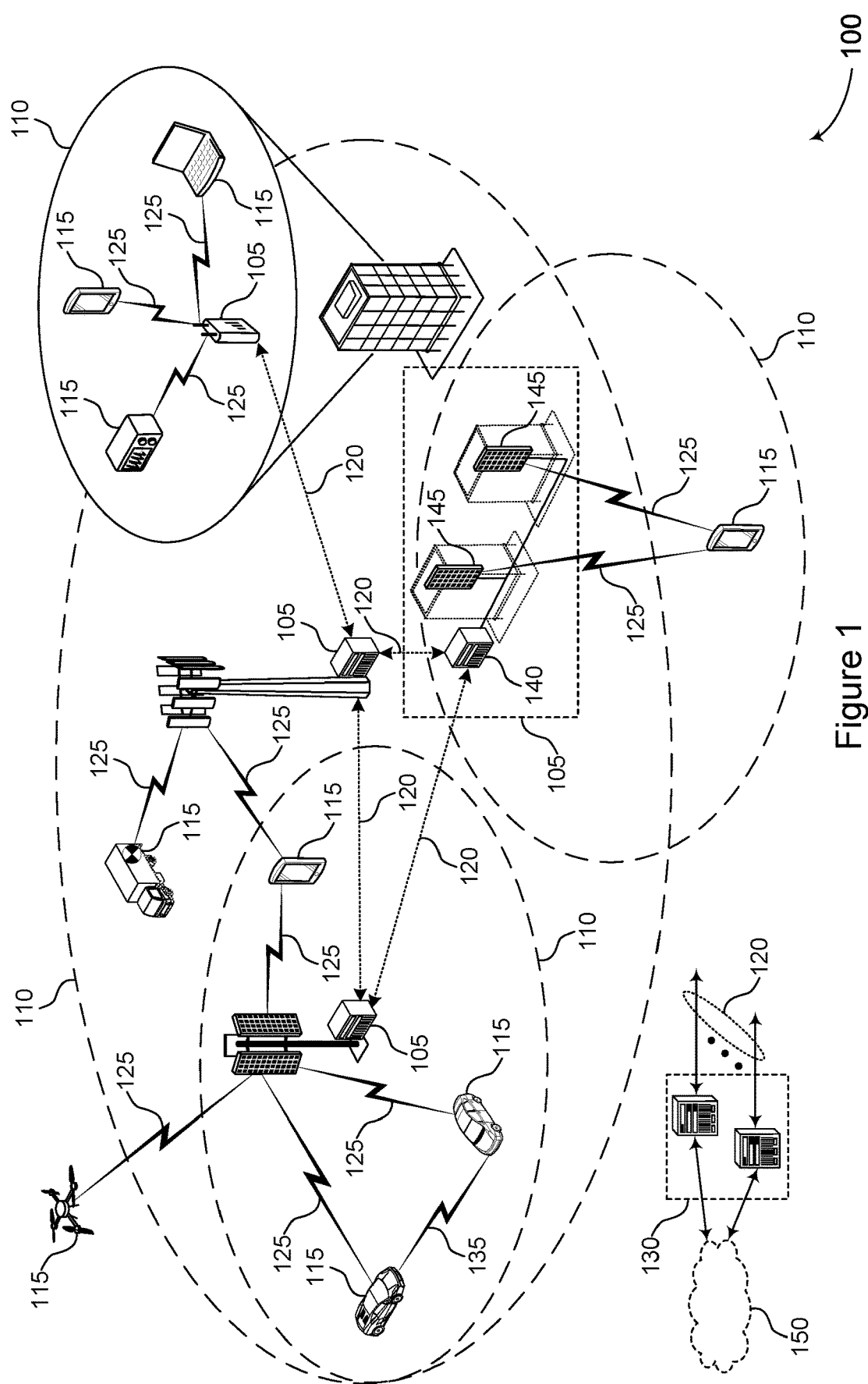
FIGS. 1 and 2 illustrate examples of wireless communications systems that support multi-stage downlink control information (DCI) for downlink transmissions in accordance with aspects of the present disclosure.

Some wireless communications systems include communication devices, such as a user equipment (UE) and a base station (for example, an eNodeB (eNB), a next-generation NodeB or a giga-NodeB, any of which may be referred to as a gNB, or some other base station), that may support multiple radio access technologies (RATs). Examples of RATs include fourth generation (4G) systems, such as Long-Term Evolution (LTE) systems, and fifth generation (5G) systems, which may be referred to as new radio (NR) systems. The UE may be configured to provide channel state information (CSI) to the base station. For example, the base station may schedule the UE to transmit a CSI report to the base station. In some cases, the base station may transmit an uplink grant, to the UE, scheduling uplink resources for the UE to transmit the CSI report. In such cases, the UE may transmit the CSI report to the base station on a physical uplink shared channel (PUSCH).

Additionally or alternatively, the base station may transmit a downlink grant, to the UE, triggering the UE to transmit the CSI report on a physical uplink control channel (PUCCH). This may enable faster CSI reporting compared to CSI reporting on the PUSCH. That is, the UE may provide to the base station more up-to-date CSI. Although the UE is configured to provide the CSI more frequently there still may be inefficiencies with CSI reporting. In some cases, because the UE transmits the CSI report after the base station transmits a downlink transmission (for example, a physical downlink shared channel (PDSCH) transmission), the channel information provided in the CSI may be suboptimal. For example, the CSI may be sub-optimal because channel conditions between the base station and the UE may have changed. As the CSI report includes channel information relevant to the base station, communications (for example, the PDSCH transmission) may be enhanced if the UE transmits the CSI report before the PDSCH transmission.

Various aspects generally relate to configuring a multi-stage downlink control information (DCI) message that enables a UE and a base station to determine a set of transmission parameters based on CSI feedback that is based on the multi-stage DCI message. The base station may initiate a multi-stage DCI procedure based on transmitting a first DCI message to the UE on a downlink control channel (for example, a physical downlink channel (PDCCH)). The first DCI message may indicate initial time and frequency resources, timing information, or transmission parameters (among other information), which the UE may use to measure CSI reference signals (CSI-RSs) and CSI interference measurement (CSI-IM) reference signals and to transmit a CSI report based on the measured CSI-RS and CSI-IM reference signals. For example, the first DCI message may include one or more of a modulation and coding scheme (MCS), a rank indicator (RI), a demodulation reference signal (DMRS) configuration, a resource block (RB) allocation, a target block error rates (BLER), or a CSI-RS and CSI CSI-IM resource configuration, among other examples.

In response to the first DCI message, the UE may transmit a first uplink control information (UCI) message, to the base station, on an uplink channel (for example, a PUSCH or a PUCCH). The first UCI message may include a feedback message associated with the UE successfully decoding the first DCI message. For example, the feedback message may be a hybrid automatic repeat request (HARQ) acknowledgement (ACK) feedback message. Additionally or alternatively, the first UCI message may include a first CSI report. The first CSI report may include an indication of transmission parameters from the initial set of transmission parameters, for example, based on UE measurements performed on one or more CSI-RS and CSI-IM reference signals. In response to the first UCI message, the base station may transmit a second DCI message to the UE including a different set of transmission parameters preferred by the UE.

The base station may transmit the second DCI message to the UE on a second downlink control channel. The second DCI message may include the different set of transmission parameters to be used by the base station and the UE for a downlink data transmission (for example, on a physical downlink shared channel (PDSCH)). In some examples, the different set of transmission parameters may be, or may include, the transmission parameters as indicated in the first CSI report. The UE may refine the set of transmission parameters as part of the multi-stage DCI procedure. That is, the base station and the UE may iteratively determine and update a set of transmission parameters. For example, the UE may repeat performing channel measurements (for example, on one or more CSI RS and CSI IM reference signals) and provide channel information in a second CSI report via a second UCI message. The second CSI report may include an indication of another different set of transmission parameters preferred by the UE. Subsequently, the base station may transmit, and the UE may receive, the downlink data transmission based on the other different set of transmission parameters.

Particular implementations of the subject matter described in this disclosure can be implemented to realize one or more of the following potential advantages. The techniques employed by the described communication devices (for example, the base station and the UE) may provide benefits and enhancements to the operation of the communication devices, such as reduced latency and improved reliability. For example, by acquiring CSI for a downlink channel before transmitting an initial downlink data transmission on the downlink channel the communications device may avoid failed or less-effective downlink transmissions, and thereby experience reduced latency and improved reliability for the downlink data transmissions. In some other examples, operations performed by the described communication devices may improve power consumption based on using the acquired CSI to reduce a number of times that the initial downlink data transmission is retransmitted.

Aspects of the disclosure are initially described in the context of wireless communications systems. Aspects of the disclosure are illustrated by and described with reference to transmission schedules and process flows. Aspects of the disclosure are further illustrated by and described with reference to apparatus diagrams, system diagrams, and flowcharts that relate to multi-stage DCI for downlink transmissions.

FIG. 1 illustrates an example of a wireless communications system 100 that supports multi-stage DCI for downlink transmissions in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110, which the UEs 115 and the base station 105 may establish one or more communication links 125. The coverage area 110 may be an example of a geographic area, which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNB, a next-generation NodeB or a giga-NodeB (also referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology. The "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol duration (for example, a duration of one modulation symbol) and one subcarrier. The symbol duration and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

The time intervals for the base stations 105 or the UEs 115 may be expressed in multiples of a basic time unit, which may, for example, refer to a sampling duration of $T_s=1/(\Delta f_{max} \cdot N_f)$ seconds, $\Delta f_{max}$ may represent the supported subcarrier spacing, and $N_f$ may represent the supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time-domain) into subframes, and each subframe may be further divided into a number of slots. Alternatively, each frame may include a variable number of slots, and the number of slots may depend on subcarrier spacing. Each slot may include a number of symbol durations (for example, depending on the length of the cyclic prefix prepended to each symbol duration). In some wireless communications systems 100, a slot may further be divided into multiple mini-slots containing one or more symbols. Excluding the cyclic prefix, each symbol duration may contain one or more (for example, $N_f$) sampling durations. The duration of a symbol duration may depend on the subcarrier spacing or frequency band of operation.

A subframe, a slot, a mini-slot, or a symbol may be the smallest scheduling unit (for example, in the time-domain) of the wireless communications system 100 and may be referred to as a transmission time interval (TTI). In some examples, the TTI duration (for example, the number of symbol durations in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol durations and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communication (URLLC) transmissions or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. If operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), multiple spatial layers are transmitted to the same receiving device, and multiple-user MIMO (MU-MIMO), multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) if receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, if receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback. The device may provide HARQ feedback in a specific slot for data received in a previous symbol in the slot. In other cases, the device may provide HARQ feedback in a subsequent slot, or according to some other time interval.

The base station 105 may transmit a first DCI message, to the UE 115, including an initial set of transmission parameters. The transmission parameters may include one or more MCSs, RIs, DMRS configurations, RB allocations, target BLERs, or CSI-RS and CSI-IM resource configurations. In response to the first DCI message, the UE 115 may transmit a UCI message to the base station 105 on an uplink channel (for example, a PUSCH or a PUCCH). In some examples, the UCI message may include a feedback message associated with the UE successfully decoding the first DCI message. For example, the feedback message may be a HARQ-ACK feedback message. Additionally or alternatively, the UCI message may include a CSI report. The CSI report may include an indication of one or more transmission parameters from the initial set of transmission parameters, for example, based on UE measurements.

Based on the UCI message, the base station 105 may transmit a second DCI message to the UE 115 including a final set of transmission parameters. The second DCI message may include the final set of transmission parameters to be used by the base station 105 and the UE 115 for an initial downlink transmission (for example, on a PDSCH). In some examples, the final set of transmission parameters may be, or may include, the transmission parameters as indicated in the CSI report. Using a multi-stage DCI procedure may improve transmission parameter selection, thereby enhancing the reliability of wireless communications.

The wireless communications system 100 may enhance downlink communications. By configuring a UE 115 to support multi-stage DCI, the UE 115 may improve the reliability and latency of the downlink reception from the base station 105 in the wireless communications system 100. As a result, the UE 115 may promote higher reliability and lower latency wireless communications, among other benefits.

Figure 2:
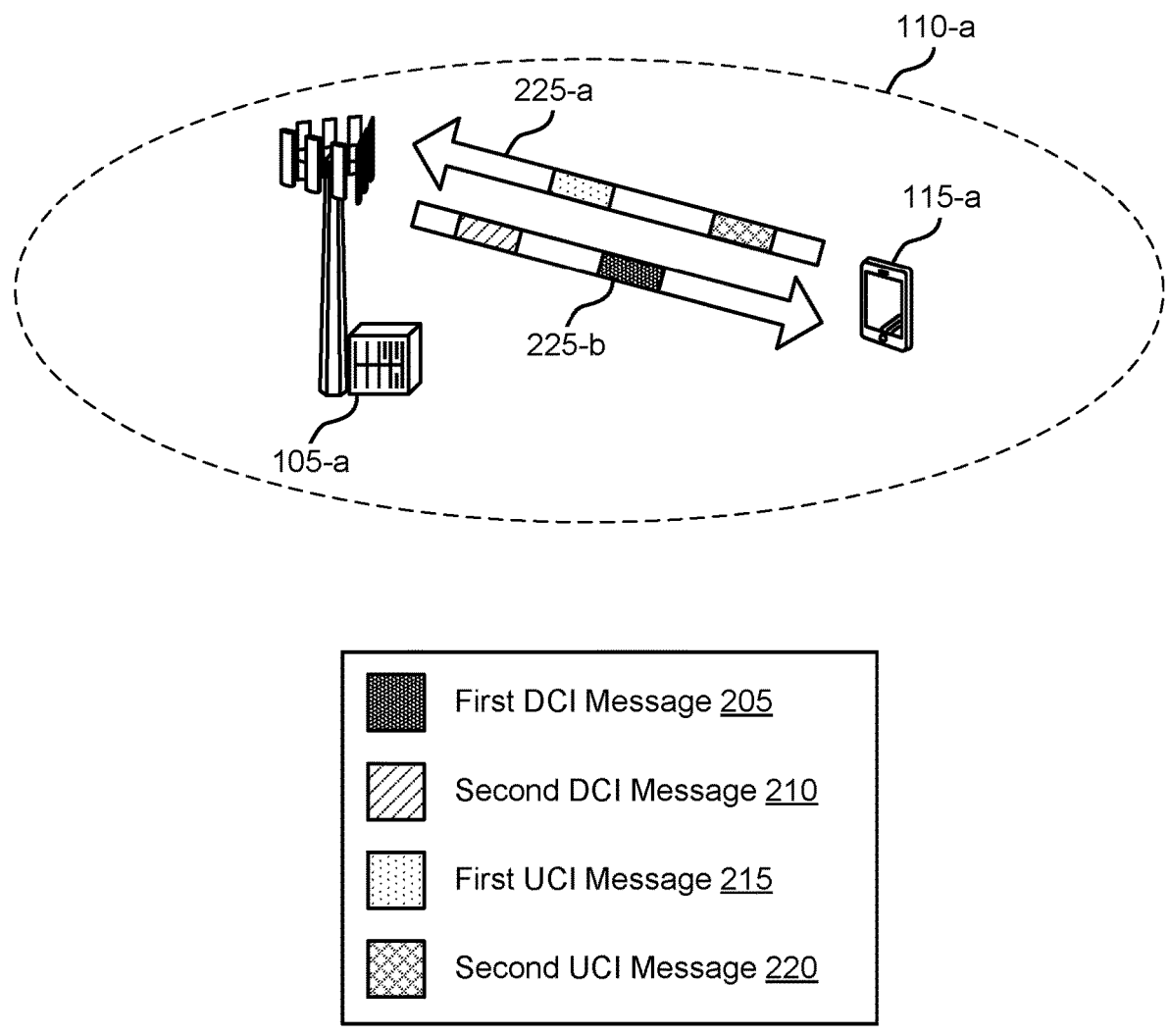

FIG. 2 illustrates an example of a wireless communications system 200 that supports multi-stage DCI for downlink transmissions in accordance with aspects of the present disclosure. The wireless communications system 200 may implement aspects of the wireless communications system 100 or may be implemented by aspects of the wireless communications system 100. The wireless communications system 200 may include a base station 105-*a* and a UE 115-*a*, which may be examples of a base station 105 and a UE 115 as described with reference to FIG. 1. The base station 105-*a* and the UE 115-*a* may communicate in a geographic coverage area 110-*a* over communication links 225 including a communication link 225-*a* (for example, an uplink) and a communication link 225-*b* (for example, a downlink), which may be examples of a geographic coverage area 110 and a communication link 125 as described with reference to FIG. 1. The wireless communications system 200 may support improvements to power consumption, spectral efficiency, higher data rates and, in some examples, may promote enhanced efficiency for higher reliability and lower latency wireless communications, among other benefits.

The base station 105-*a* may configure the UE 115-*a* to transmit a CSI report related to a downlink channel between the base station 105-*a* and the UE 115-*a*. As an example, the base station 105-*a* may schedule the UE 115-*a* to transmit an aperiodic CSI (A-CSI) report on PUSCH resources via an uplink grant. An A-CSI report scheduled via an uplink grant may be equivalently referred to as an uplink-triggered A-CSI report. Limited PUSCH resource availability may increase latency associated with uplink-triggered A-CSI reporting. As an alternative to uplink-triggered A-CSI reporting, the base station 105-*a* may instead use a downlink grant to trigger an A-CSI report from the UE 115-*a* on PUCCH resources. Scheduling an A-CSI report via a downlink grant may be equivalently referred to as downlink-triggered A-CSI reporting. Downlink-triggered A-CSI reporting on PUCCH resources may enable faster A-CSI reporting in comparison to uplink-triggered A-CSI reporting. As a result, downlink-triggered A-CSI reporting may provide the base station 105-*a* with more up-to-date CSI information that the base station 105-*a* can use to improve PDSCH performance.

The base station 105-*a* may transmit the downlink grant in a DCI message. For example, the base station 105-*a* may transmit a DCI message with a CSI trigger field (for example, x bits) that indicates a CSI trigger state. The CSI trigger state may include one or more of a CSI report setting, a CSI-RS resource setting, or a CSI-IM resource setting. The UE 115-*a* may receive the DCI message and may transmit a downlink-triggered A-CSI report (for example, a CSI-RS report), in response to the DCI message. Using the DCI message to trigger the A-CSI report may allow the base station 105-*a* to receive the A-CSI report with reduced latency and increased reliability (for example, in comparison to uplink-triggered A-CSI reporting).

In addition to the CSI trigger state, the DCI message may include an indication of CSI-RS and CSI-IM resources. The base station 105-*a* may transmit one or more CSI-RS and CSI-IM reference signals on the indicated CSI-RS and CSI-IM resources. Accordingly, the UE 115-*a* may measure the one or more CSI-RS and CSI-IM reference signals based on the DCI message and may include information related to the measured CSI-RS and CSI-IM reference signals in the A-CSI report. The base station 105-*a* may use the A-CSI report to transmit an initial downlink transmission on PDSCH resources with increased reliability.

The DCI message may also include an indication of a scheduled downlink transmission on PDSCH resources. For example, the DCI message may include time and frequency resources, timing information, or transmission parameters (for example, one or more MCSs) associated with the scheduled downlink transmission. The base station 105-*a* may configure the UE 115-*a* to transmit the A-CSI report after receiving the scheduled downlink transmission on the PDSCH resources. As such, the base station 105-*a* may be unable to use the A-CSI report to improve the reliability of the scheduled downlink transmission.

The scheduled downlink transmission may be a URLLC transmission as described with reference to FIG. 1. URLLC transmissions may occur in bursts with short durations (for example, over mini-slots) and may be associated with higher levels of reliability (for example, residual BLERs of 1e-5). In such cases, retransmitting the scheduled downlink transmission may result in a significant time delay that may not satisfy URLLC latency thresholds. Ensuring that the UE 115-*a* is able to successfully receive an initial transmission of the scheduled downlink transmission may be important for meeting URLLC latency thresholds. In such cases, if the base station 105-*a* receives the A-CSI report after transmitting the scheduled downlink transmission, the base station 105-*a* may be unable to use the A-CSI report to transmit the initial transmission of the scheduled downlink transmission with improved reliability. The scheduled downlink transmission may thereby exceed URLLC latency and reliability thresholds.

The wireless communications system 200 may support faster CSI acquisition based on using at least a multi-stage DCI procedure to obtain CSI before an initial transmission of a downlink transmission, thereby improving reliability of the initial transmission and reducing a number of times the downlink transmission is retransmitted. Over the first stage of the multi-stage DCI procedure, the base station 105-*a* may transmit a first DCI message 205 to the UE 115-*a*. The first DCI message 205 may indicate one or more time and frequency resources, timing information, or an initial set of transmission parameters associated with a second DCI message 210 and a first UCI message 215. Additionally, the first DCI message 205 may indicate a set of CSI measurement resources on which the UE 115-*a* is to measure one or more CSI-RS and CSI-IM reference signals. The UE 115-*a* may transmit, to the base station 105-*a*, the first UCI message 215 based on receiving the first DCI message 205 and measuring the one or more CSI-RS and CSI-IM reference signals. The first UCI message 215 may include a CSI report associated with the measured CSI-RS and CSI-IM reference signals.

Over the second stage of the multi-stage DCI procedure, the base station 105-*a* may transmit, to the UE 115-*a*, a second DCI message 210 based on the first UCI message 215. The second DCI message 210 may indicate one or more time and frequency resources, timing information, or a final set of transmission parameters associated with an initial downlink transmission (for example, a URLLC transmission) and a second UCI message 220. The UE 115-*a* may receive the initial downlink transmission based on the second DCI message 210 and may transmit the second UCI message 220 based on receiving the initial downlink transmission. As a result of receiving the first UCI message 215 from the UE 115-*a* before transmitting the initial downlink transmission to the UE 115-*a*, the base station 105-*a* may use the CSI report included in the first UCI message 215 to improve the reliability of the initial downlink transmission (as opposed to a retransmission of the downlink transmission), thereby reducing the likelihood of the initial downlink transmission exceeding URLLC latency and reliability thresholds.

In some examples, the multi-stage DCI procedure may indicate an initial set of transmission parameters and a final set of transmission parameters via the first DCI message 205 and the second DCI message 210. More specifically, the first DCI message 205 may indicate the initial set of transmission parameters, which may include one or more of a channel quality indicator (CQI), an MCS, an RI, a DMRS configuration, a time-domain resource allocation (TDRA) index, an RB allocation, a target BLER, or a CSI-RS and CSI-IM resource configuration. Likewise, the second DCI message 210 may indicate the final set of transmission parameters, which may be the same or different than the initial set of transmission parameters. In some examples, one or more of the initial set of parameters may be signaled before the multi-stage DCI procedure. For example, one or more of the initial sets of transmission parameters (which may also be referred to as CSI parameters) may be signaled in an RRC message or in a MAC-control element (CE) message.

Additionally or alternatively, the first DCI message 205 may include resource information associated with the second DCI message 210. The resource information may include one or more of a time location (for example, search space occasions), an aggregation level, or a physical downlink control channel (PDCCH) candidate index associated with the second DCI message 210. That is, the first DCI message 205 may indicate the second DCI message 210, such that the UE 115-*a* may receive the second DCI message 210 without performing a blind search. Including the resource information in the first DCI message 205 may reduce the complexity and error rate of decoding the second DCI message 210.

The first DCI message 205 may also configure the UE 115-*a* to transmit HARQ-ACK feedback and CSI information in the first UCI message 215. For example, the first DCI message 205 may include uplink resources for transmitting the HARQ-ACK feedback on PUCCH resources associated with the first UCI message 215 as well as an offset (for example, of symbols, slots, or sub-slots) between the first DCI message 205 (for example, the last PDCCH OFDM symbol of the first DCI message 205) and the first UCI message 215 (for example, the first PUCCH OFDM symbol of the first UCI message 215). Alternatively, the base station 105-*a* may configure the UE 115-*a* with a PUCCH resource identifier (ID) in an RRC configuration phase. The PUCCH resource ID may include one or more of a starting OFDM symbol, a number of OFDM symbols, a starting RB, or a threshold number of RBs related to the first UCI message 215. In such examples, including an offset in the first DCI message 205 may be sufficient for the UE 115-*a* to determine uplink resources to use for transmitting HARQ-ACK feedback and a CSI report as a part of the first UCI message 215.

In some examples, the first DCI message 205 may be associated with a high level of importance. To enhance transmission robustness of the first DCI message 205, the UE 115-a may send HARQ-ACK feedback to the base station 105-a (for example, the network) to indicate whether the UE 115-a has decoded the first DCI message 205 correctly. That is, the base station 105-a may determine that the UE 115-a has successfully decoded the first DCI message 205 based on the HARQ-ACK feedback. Additionally or alternatively, if reliability of the first DCI message 205 is associated with a high level of importance, the base station 105-a may repeat the first DCI message 205 over multiple beams or may increase an aggregation level of the first DCI message 205.

In some examples the second DCI message 210 may be a DCI message indicating a final set of transmission parameters. The final set of transmission parameters may include one or more of a CQI, an MCS, an RI, a DMRS configuration, TDRA indices, RB allocations, a target BLER, or a CSI-RS and CSI-IM resource configuration, which the base station 105-a may use to transmit the initial downlink transmission on PDSCH resources. In some examples, the final set of transmission parameters indicated by the second DCI message 210 may be different than the initial set of transmission parameters indicated by the first DCI message 205 (for example, based on the feedback received in the first UCI message 215). The first DCI message 205 (for example, instead of the second DCI message 210) may indicate TDRA indices and RB allocations for receiving the initial downlink transmission, such that the UE 115-a may perform an early determination of resources to be used for computing an MCS and CSI for the initial downlink transmission.

A CSI report field in one or both of the first DCI message 205 or the second DCI message 210 may enable or disable CSI reports (and content in the CSI reports) based on the initial downlink transmission. Having the CSI report field in the second DCI message 210 may reduce a size of the first DCI message 205, thereby increasing the likelihood that the first DCI message 205 is reliably decoded by the UE 115-a. In some examples, the base station 105-a may also add an additional stage to the multi-stage DCI procedure to further improve reliability. That is, the base station 105-a may employ a DCI procedure with 3 DCI stages, in which one or both of the first stage or the second stage includes HARQ-ACK information. In some examples, a DCI stage with more important information (for example, CSI) may include HARQ-ACK information.

In some examples, the base station 105-a may transmit timing information to the UE 115-a via one or more of the first DCI message 205, the second DCI message 210, an RRC message, or a MAC-CE message. The timing information may indicate one or more of a time interval between the first DCI message 205 and the first UCI message 215, a time interval between the CSI-RS and CSI-IM resources and the first UCI message 215, a time interval between the second DCI message 420 and the downlink transmission, or a time interval between the downlink transmission and the second UCI message 220. In some examples, a subset of the timing information may be signaled (for example, by the base station 105-a) via a TDRA index and another subset of the timing information may be explicitly configured in either the first DCI message 205 or the second DCI message 210.

The first UCI message 215 may include a CSI report based on the measured CSI-RS and CSI-IM reference signals. The CSI report may include one or more of a selection of a DMRS configuration, an MCS and RI pair, or TDRA and RB allocation indices from corresponding parameters signaled in the first DCI message 205. If, for example, the TDRA indices signaled in the first DCI message 205 share common timing information (for example, if the TDRA indices are configured with the same time interval 440), time-domain allocation may be enhanced. That is, the common timing information may not be an adjustable parameter. As a result, the first UCI message 215 may indicate the TDRA and RB allocation indices with a single value. Alternatively, the first UCI message 215 may not indicate any selection of a TDRA index or an RB allocation index.

Additionally, the CSI report of the first UCI message 215 may include other CSI reporting values such as a recommended CQI or MCS, which may be based on both the CSI-RS resources and the CSI-IM resources (for example, such that interference measurements may be considered). In some examples, the recommended CQI or MCS may correspond to a target BLER. In some other examples, a modification may be applied to the best selected MCS from the MCSs signaled (for example, in the first DCI message 205) based on the CSI-RS resources and the CSI-IM resources. Additionally or alternatively, the other CSI reporting values may include one or more of an RI, a layer-one reference signal received power (L1-RSRP), a CSI-RS resource indicator (CRI), or one or more best beams (for example, depending on how the CSI report is configured). In some examples, the CSI report may include a CRI, if multiple CSI-RS resources are configured for the UE 115-a. That is, the UE 115-a may select the best CSI-RS resource from the multiple configured CSI-RS resources and may indicate the best CSI-RS resource in the CSI report. In such examples, the base station 105-a may determine a precoder and corresponding CSI reporting values based on the selected CRI.

The second UCI message 220 may include HARQ-ACK feedback related to the initial downlink transmission. For example, the second UCI message 220 may indicate whether or not the UE 115-a successfully received the initial downlink transmission. The UE 115-a may transmit the second UCI message 220 based on one or both of the first DCI message 205 or the second DCI message 210. The UE 115-a may transmit the second UCI message 220 using one or more time and frequency resources, a timing offset, or an MCS indicated by the first DCI message 205 or the second DCI message 210. In some examples, the second UCI message 220 may include an additional CSI report based on a CSI trigger field indicated by the second DCI message 210. The additional CSI report may include CSI report parameters similar to CSI report parameters in the first DCI message 205, which the base station 105-a may use to improve reliability for subsequent PDSCH transmissions (for example, retransmissions of the initial downlink transmission).

FIG. 3A illustrates an example of transmission schedule 300 that supports multi-stage DCI for downlink transmissions in accordance with aspects of the present disclosure. FIG. 3B illustrates an example of transmission schedule 301 that supports multi-stage DCI for downlink transmissions in accordance with aspects of the present disclosure. The transmission schedules 300 and 301 may implement aspects of the wireless communications systems 100 and 200 or may be implemented by aspects of the wireless communications system 100 and 200 as described with reference to FIGS. 1 and 2, respectively. For example, the transmission schedules 300 and 301 may implement or be implemented by a base station 105 and a UE 115.

In the example of FIG. 3A, the base station 105 may transmit a downlink grant 305-*a* to the UE 115. The downlink grant 305-*a* may indicate one or more time and frequency resources or transmission parameters for measuring CSI-RS and CSI-IM reference signals on CSI-RS and CSI-IM resources 310-*a*, receiving an initial downlink transmission on PDSCH resources 315-*a*, and transmitting a UCI message on PUCCH resources 320. In some examples, the transmission parameters indicated by the downlink grant 305-*a* may include one or more of an MCS, an RI, a DMRS configuration, a TDRA index, an RB allocation, or timing information related to one or more of the CSI-RS and CSI-IM resources 310-*a*, the PDSCH resources 315-*a*, or the PUCCH resources 320. For example, the downlink grant 305-*a* may include one or more of an indication 370-*a* of the CSI-RS and CSI-IM resources 310-*a*, an indication 375-*a* of the PDSCH resources 315-*a*, or an indication 380 of the PUCCH resources 320. The UE 115 may determine the transmission parameters indicated by the downlink grant 305-*a* to use for the CSI-RS and CSI-IM resources 310-*a*, the PDSCH resources 315-*a*, and the PUCCH resources 320 based on the indications 370-*a*, 375-*a*, and 380.

In some examples, the downlink grant 305-*a* may indicate one or more time intervals related to one or more of the CSI-RS and CSI-IM resources 310-*a*, the PDSCH resources 315-*a*, or the PUCCH resources 320. For example, the downlink grant 305-*a* may indicate one or more of a time interval 325-*a* between the downlink grant 305-*a* and the PDSCH resources 315-*a*, a time interval 330 between the PDSCH resources 315-*a* and the PUCCH resources 320, or a time interval 335 between the CSI-RS and CSI-IM resources 310-*a* and the PUCCH resources 320. In some examples, the downlink grant 305-*a* may indicate the one or more time intervals as a duration between a last symbol of a first resource and a first symbol of a second resource. For example, the downlink grant 305-*a* may indicate the time interval 330 as a duration between the last symbol of the PDSCH resources 315-*a* and the first symbol of the PUCCH resources 320. The UE 115 may use the one or more time intervals indicated by the downlink grant 305-*a* to determine a duration for measuring the CSI-RS and CSI-IM reference signals on the CSI-RS and CSI-IM resources 310-*a*, a duration for receiving the downlink transmission on the PDSCH resources 315-*a*, and a duration for transmitting the UCI message on the PUCCH resources 320.

The UCI message on the PUCCH resources 320 may include both a CSI report and HARQ-ACK feedback for the initial downlink transmission on the PDSCH resources 315-*a*. The UE 115 may transmit the CSI report and the HARQ-ACK feedback based on receiving the downlink transmission (for example, on the PDSCH resources 315-*a*), measuring the CSI-RS and CSI-IM reference signals (for example, on the CSI-RS and CSI-IM resources 310-*a*), and receiving the downlink grant 305-*a*. In some examples, the downlink grant 305-*a* may indicate CSI report fields for the UE 115 to include in the CSI report. The UE 115 may include the indicated CSI report fields in the CSI report. In addition, the UE 115 may measure the CSI-RS and CSI-IM reference signals on the CSI-RS and CSI-IM resources 310-*a* and may include information associated with the measured CSI-RS and CSI-IM reference signals in the CSI report. The HARQ-ACK feedback included in the UCI message may indicate whether or not the UE 115 successfully received and decoded the downlink transmission on the PDSCH resources 315-*a*. The UCI message may include information (for example, a CSI report and HARQ-ACK feedback) corresponding to the downlink grant 305-*a*, the CSI-RS and CSI-IM resources 310-*a*, and the PDSCH resources 315-*a*.

In the example of FIG. 3B, the base station 105 may transmit a downlink grant 305-*b* to the UE 115. The downlink grant 305-*b* may indicate one or more time and frequency resources or transmission parameters for measuring CSI-RS and CSI-IM reference signals on CSI-RS and CSI-IM resources 310-*b*, receiving a downlink transmission on PDSCH resources 315-*b*, transmitting a first UCI message on PUCCH resources 345, and transmitting a second UCI message on PUCCH resources 350. In some examples, the transmission parameters indicated by the downlink grant 305-*b* may include one or more of an MCS, an RI, a DMRS configuration, a TDRA index, an RB allocation, or timing information related to one or more of the CSI-RS and CSI-IM resources 310-*b*, the PDSCH resources 315-*b*, the PUCCH resources 345, or the PUCCH resources 350. For example, the downlink grant 305-*b* may include one or more of an indication 370-*b* of the CSI-RS and CSI-IM resources 310-*b*, an indication 375-*b* of the PDSCH resources 315-*b*, an indication 385 of the PUCCH resources 345, or an indication 390 of the PUCCH resources 350. The UE 115 may determine the transmission parameters indicated by the downlink grant 305-*b* to use for one or more of the CSI-RS and CSI-IM resources 310-*b*, the PDSCH resources 315-*b*, the PUCCH resources 345, and the PUCCH resources 350 based on the indications 370-*b*, 375-*b*, and 385, and 390.

The downlink grant 305-*b* may indicate one or more time intervals related to one or more of the CSI-RS and CSI-IM resources 310-*b*, the PDSCH resources 315-*b*, the PUCCH resources 345, or the PUCCH resources 350. For example, the downlink grant 305-*b* may indicate one or more of a time interval 325-*b* between the downlink grant 305-*b* and the PDSCH resources 315-*b*, a time interval 355 between the PDSCH resources 315-*b* and the PUCCH resources 345, a time interval 360 between the CSI-RS and CSI-IM resources 310-*b* and the PUCCH resources 345, or a time interval 365 between the downlink grant 305-*b* and the PUCCH resources 345. The downlink grant 305-*b* may indicate the one or more time intervals as a duration between a last symbol of a first resource and a first symbol of a second resource.

For example, the downlink grant 305-*b* may indicate the time interval 355 as a duration between the last symbol of the PDSCH resources 315-*b* and the first symbol of the PUCCH resources 350. The UE 115 may use the one or more time intervals indicated by the downlink grant 305-*b* to determine a duration for measuring the CSI-RS and CSI-IM reference signals on the CSI-RS and CSI-IM resources 310-*b*, a duration for receiving the downlink transmission on the PDSCH resources 315-*b*, a duration for transmitting the first UCI message on the PUCCH resources 345, and a duration for transmitting the second UCI message on the PUCCH resources 350.

In contrast to the transmission schedule 300, the UE 115 may transmit a CSI report and HARQ-ACK feedback in separate UCI messages. For example, the UE 115 may transmit a CSI report corresponding to the downlink grant 305-*b* and the measured CSI-RS and CSI-IM reference signals in the first UCI message on the PUCCH resources 345, and may transmit HARQ-ACK feedback related to the downlink transmission in the second UCI message on the PUCCH resources 350. As such, the downlink grant 305-*b* may indicate information (for example, transmission parameters, timing information, resource allocations) for both the PUCCH resources 345 and the PUCCH resources 350.

In both the transmission schedules 300 and 301, the UE 115 may transmit a CSI report (for example, on the PUCCH resources 320 and 345) after receiving a downlink transmission (for example, on the PDSCH resources 315-a and 315-b). As a result, the base station 105 may be unable to use the CSI report to improve the likelihood of the UE 115 successfully receiving the downlink transmission. That is, the base station 105 may use the CSI report to improve subsequent downlink transmissions (for example, retransmissions of the downlink transmission) to the UE 115. The transmission schedules 300 and 301 may as result be in inefficient and unreliable downlink transmissions between the base station 105 and the UE 115.

Figure 4:
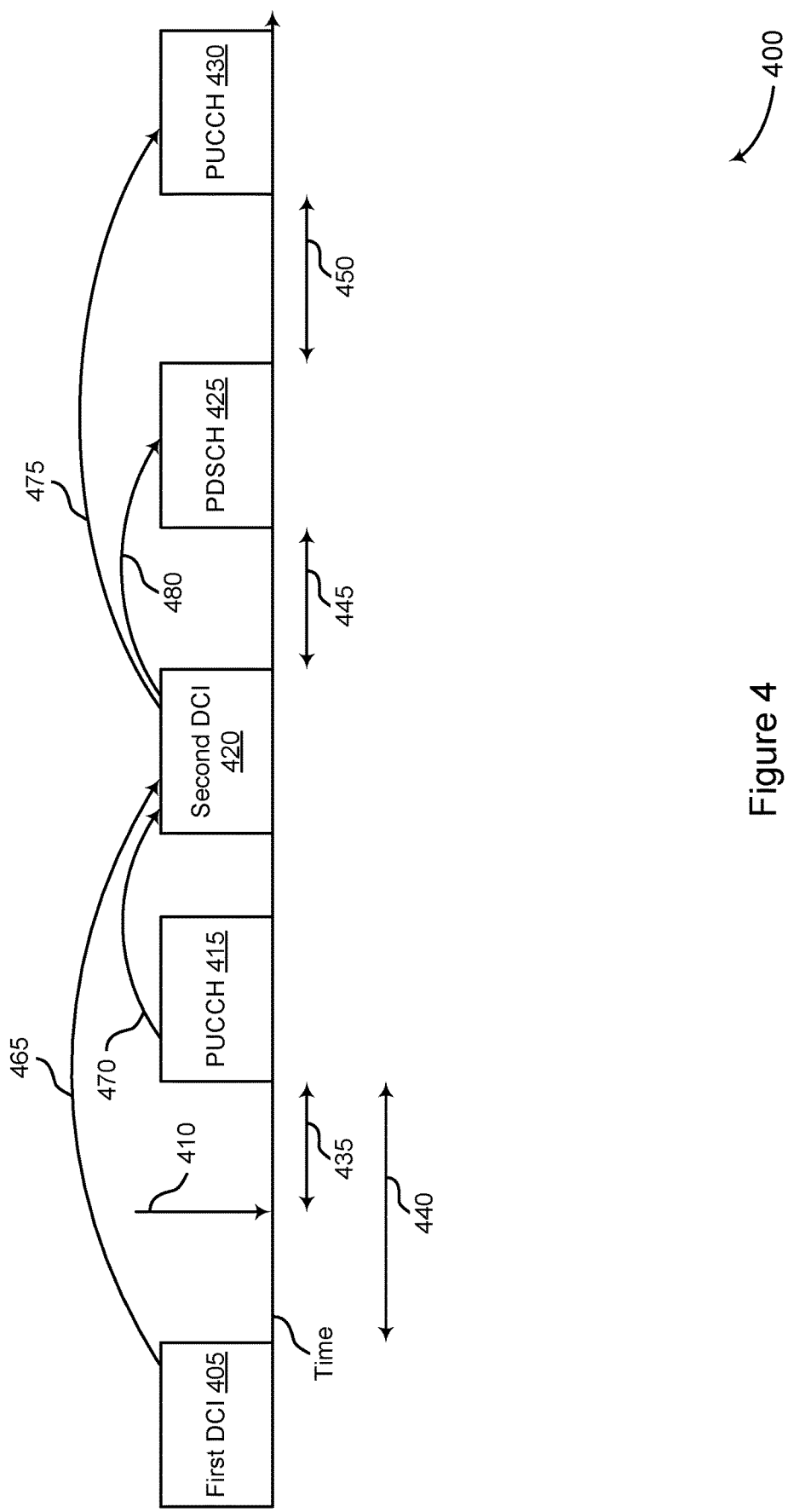
FIG. 4 illustrates an example of a transmission schedule that supports multi-stage DCI for downlink transmissions in accordance with aspects of the present disclosure.

FIG. 4 illustrates an example of a transmission schedule 400 that supports multi-stage DCI for downlink transmissions in accordance with aspects of the present disclosure. The transmission schedule 400 may implement aspects of the wireless communications systems 100 and 200 or may be implemented by aspects of the wireless communications system 100 and 200 as described with reference to FIGS. 1 and 2, respectively. For example, the transmission schedule 400 may implement or be implemented by a base station 105 and a UE 115. In the example of FIG. 4, a base station 105 may transmit a first DCI message 405 and a second DCI message 420 to a UE 115, as part of a multi-stage DCI procedure. The UE 115 may measure CSI-RS and CSI-IM references signals on CSI-RS and CSI-IM resources 410, transmit a first UCI message on PUCCH resources 415, receive an initial downlink transmission on PDSCH resources 425, and transmit a second UCI message on PUCCH resources 430 based on the first DCI message 405 and the second DCI message 420.

To initiate the multi-stage DCI procedure, the base station 105 may transmit the first DCI message 405 to the UE 115 on a downlink channel (for example, a PDCCH). The first DCI message 405 may indicate one or more time and frequency resources, timing information, or transmission parameters. For example, the first DCI may indicate one or more of an MCS, an RI, a DMRS configuration, a TDRA index, a frequency-domain resource allocation (FDRA) index, a CQI, an RSRP indicator, a CRI, or a beam indicator. The first DCI message 405 may also include an indication 465 of the second DCI message 420. For example, the first DCI message 405 may indicate a search space in which the second DCI message 420 is to be transmitted. In some examples, the first DCI message 405 may include timing information related to one or more of the CSI-RS and CSI-IM resources 410, the PUCCH resources 415, the second DCI message 420, the PDSCH resources 425, or the PUCCH resources 430. For example, the first DCI message 405 may indicate one or more of a time interval 435 between the CSI-RS and CSI-IM resources 410 and the PUCCH resources 415, or a time interval 440 between the first DCI message 405 and the PUCCH resources 415.

After transmitting the first DCI message 405, the base station 105 may transmit one or more CSI-RS and CSI-IM reference signals on the CSI-RS and CSI-IM resources 410. The UE 115 may measure the CSI-RS and CSI-IM reference signals on the CSI-RS and CSI-IM resources 410 based on the first DCI message 405. For example, if the first DCI message 405 indicates a CRI, the UE 115 may measure the CSI-RS and CSI-IM reference signals in accordance with the CRI. In some examples, the first DCI message 405 may include other parameters (for example, an MCS or a timing offset) for the UE 115 to use for measuring the CSI-RS and CSI-IM reference signals. The UE 115 may transmit a first UCI message to the base station 105 on the PUCCH resources 415 based on receiving the first DCI message 405 and measuring the CSI-RS and CSI-IM reference signals on the CSI-RS and CSI-IM resources 410.

In some examples, the first UCI message may include one or both of a CSI report related to the measured CSI-RS and CSI-IM reference signals or HARQ-ACK feedback related to the first DCI message 405. For example, the first UCI message may include a CSI report that indicates one or more CSI report fields (for example, a CQI or an RSRP) related to the measured CSI-RS and CSI-IM reference signals and HARQ-ACK feedback indicating whether or not the UE 115 successfully received the first DCI message 405 on the downlink channel. In some examples, the first UCI message may include an indication 470 of the second DCI message 420. The indication 470 may signal one or more preferred transmission parameters that the base station may use to transmit the second DCI message 420. For example, the UE 115 may indicate a specific MCS or a transmit beam for the base station 105 to use, such that the UE 115 may receive the second DCI message 420 with a relatively high signal quality.

The base station 105 may transmit the second DCI message 420 according to the timing information indicated by the first DCI message 405. For example, the base station 105 may transmit the second DCI message 420 in a search space indicated by the first DCI message or after a time offset indicated by the first DCI message 405. In some examples, the base station 105 may transmit the second DCI message 420 based on the first UCI message. As an example, the base station 105 may use one or more of the preferred transmission parameters indicated by the first UCI message to transmit the second DCI message 420. The second DCI message 420 may include one or both of an indication 480 of the PDSCH resources 425 or an indication 475 of the PUCCH resources 430. The indication 480 may signal one or more time and frequency resources, timing information, or transmission parameters for receiving the downlink transmission on the PDSCH resources 425. Likewise, the indication 475 may signal one or more time and frequency resources, timing information, or CSI report parameters for transmitting the second UCI message on the PUCCH resources 430. Additionally or alternatively, the second DCI message 420 may indicate a time interval 445 between the second DCI message 420 and the PDSCH resources 425 as well as a time interval 450 between the PDSCH resources 425 and the PUCCH resources 430.

After transmitting the second DCI message 420, the base station 105 may transmit the initial downlink transmission on the PDSCH resources 425. The base station 105 may transmit the initial downlink transmission in accordance with the first DCI message 405 and the second DCI message 420. For example, the base station 105 may transmit the initial downlink transmission after the time interval 445 indicated by one or both of the first DCI message 405 or the second DCI message 420. In some examples, the base station 105 may transmit the initial downlink transmission on the PDSCH resources 425 using one or more preferred transmission parameters indicated by the first UCI message. As an example, the base station 105 may use an MCS or a transmit beam indicated by the first UCI message, such that the UE 115 may receive the initial downlink transmission on the PDSCH resources 425 with increased reliability. In contrast to the transmission schedules 300 and 301 as described with reference to FIG. 3, the base station 105 may obtain feedback (for example, a CSI report) from the UE 115 before transmitting the initial downlink transmission on the PDSCH resources 425. As a result, the UE 115 may receive the initial downlink transmission with increased reliability.

The UE 115 may transmit the second UCI message on the PUCCH resources 430 in response to receiving the initial downlink transmission on the PDSCH resources 425. The second UCI message may include one or both of HARQ-ACK feedback and a CSI report. The HARQ-ACK feedback may indicate whether or not the UE 115 successfully received the initial downlink transmission on the PDSCH resources 425, whereas the CSI report may indicate one or more CSI report parameters corresponding to one or both of the second DCI message 420 or the downlink transmission. The UE 115 may transmit the second UCI message after the time interval 450, which may be signaled in one or both of the first DCI message 405 or the second DCI message 420.

In some examples, the base station 105 may indicate the time interval 445 (for example, k0) as well as a difference between the time interval 435 (for example, z) and the time interval 440 (for example, z') in modified TDRA tables. In other words, the base station 105 may configure the UE 115 with a modified TDRA configuration (for example, in an RRC configuration phase) that includes one or more fields associated with the time intervals 435, 440, and 445. The base station 105 may then dynamically (for example, via the first DCI message 405 or the second DCI message 420) signal a TDRA index associated with the modified TDRA configuration to the UE 115. As a result, the UE 115 may determine values for the time interval 445 as well as the difference (for example, z-z') between the time intervals 435 and 440 based on the signaled TDRA index.

Prior to modification, a TDRA configuration (for example, PDSCH-TimeDomainResourceAllocation) of the UE 115 may include one or more fields (for example, k0, mappingType, startSymbolAndLength), one or more object types corresponding to the one or more fields (for example, INTEGER (0..32), ENUMERATED {typeA, typeB}, INTEGER (0..127)), and one or more optional values related to the one or more fields. The TDRA configuration of the UE 115 may include a field for the time interval 445 prior to modification. The base station 105 may modify the TDRA configuration of the UE 115 in an RRC configuration phase based on augmenting the TDRA configuration with a new field (for example, z-z'), an object type corresponding to the new field (for example, INTEGER (0..32) [32 or more]), and an optional value related to the new field. The new field may represent the difference between the time intervals 435 and 440 in time-domain units (for example, symbols, subslots, or slots). Each index associated with the modified TDRA configuration may have corresponding values for the time interval 445 and for the difference between the time intervals 435 and 440.

In addition, the base station 105 may signal a value for the time interval 435 in the first DCI message 405 and may signal a value for the time interval 450 in the second DCI message 420. The UE 115 may determine values for the time intervals 435 and 440 based on the value signaled in the first DCI message 405 and the difference between the time intervals 435 and 440 indicated by a TDRA index associated with the modified TDRA configuration. Alternatively, the base station 105 may signal both the time interval 435 and the time interval 440 in an RRC message (for example, as part of a CSI-RS resource and report configuration) or in the first DCI message 405. Neither the time interval 445 nor the time interval 450 may be used for the first stage of the multi-stage DCI procedure described with reference to FIG. 2.

Figure 5:
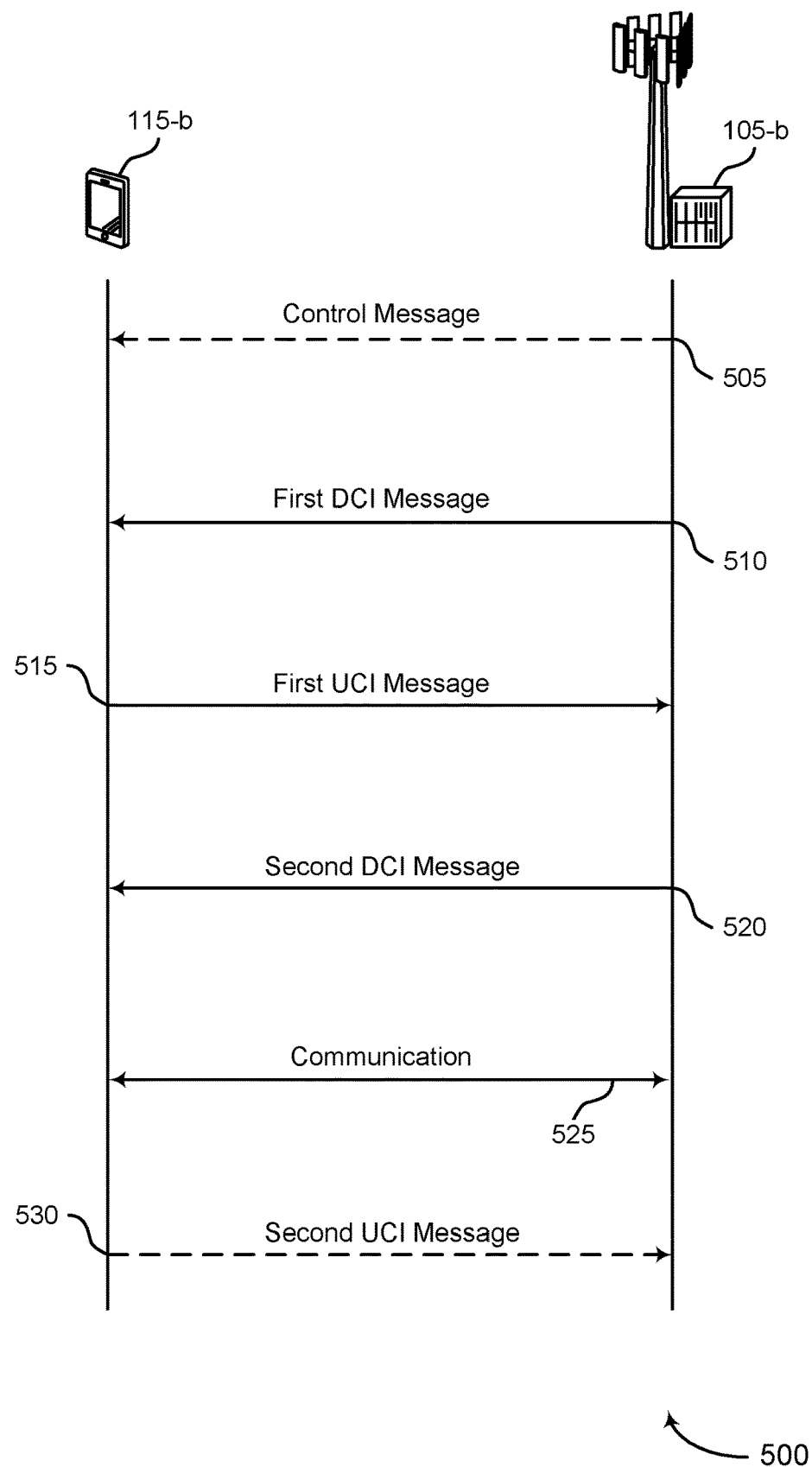
FIG. 5 illustrates an example of a process flow that supports multi-stage DCI for downlink transmissions in accordance with aspects of the present disclosure.

FIG. 5 illustrates an example of a process flow 500 that supports multi-stage DCI for downlink transmissions in accordance with aspects of the present disclosure. The process flow 500 may implement aspects of the wireless communications systems 100 and 200 or may be implemented by aspects of the wireless communications system 100 and 200 as described with reference to FIGS. 1 and 2, respectively. For example, the process flow 500 may implement or be implemented by a base station 105-b and a UE 115-b.

At 505, the base station 105-b may transmit a semi-static control message to the UE 115-b. The semi-static control message may include one or both of an RRC message or a MAC-CE message. The semi-static control message may indicate a transmission configuration that includes one or more transmission parameters. For example, the transmission configuration may include one or more of a CQI, an MCS, an RI, a beam indicator, a L1-RSRP indicator, a CRI, a TDRA, or an RB allocation. Additionally or alternatively, the semi-static control message may indicate one or more first timing information, second timing information, or a bitmap associated with a set of RB allocations.

At 510, the base station 105-b may transmit a first DCI message to the UE 115-b on a downlink control channel (for example, a PDCCH). The DCI message may indicate a first set of transmission parameters, which may include one or more of a CQI, an MCS, an RI, a beam indicator, a L1-RSRP indicator, a CRI, a TDRA, or an RB allocation. In some examples, the UE 115-b may determine an uplink control channel resource identifier based on the first DCI message.

At 515, the UE 115-b may transmit a first UCI message to the base station 105-b on an uplink control channel (for example, a PUCCH) based on the first DCI message. The first UCI message may include a first feedback and a first CSI report. The first feedback may indicate a result of a decoding operation on the first DCI message.

The UE 115-b may transmit the first UCI message based on determining first timing information and second timing information from one or both of the semi-static control message or the first DCI message. The first timing information may include one or more of an ending symbol associated with the first DCI message in a time-domain, or a duration between the ending symbol associated with the first DCI message and a beginning symbol associated with the first UCI message in the time-domain. The second timing information may include one or more of a beginning symbol associated with a CSI-IM resource, or a duration between the beginning symbol associated with the CSI-IM resource and the beginning symbol associated with the first UCI message in the time-domain.

Additionally or alternatively, the UE 115-b may transmit the first UCI message based on determining (for example, based on the semi-static control message or the first DCI message) one or more of a number of symbols, a starting RB, or a number of RBs associated with the first UCI message. In some examples, the UE 115-b may determine an offset in a time-domain between an ending symbol associated with the first DCI message and a beginning symbol associated with the first UCI, and may determine one or more resources to transmit the first UCI message based on determining the offset in the time-domain. Accordingly, the UE 115-b may transmit the first UCI message on the uplink control channel based on determining the one or more resources.

At 520, the base station 105-b may transmit a second DCI message to the UE 115-b on the downlink control channel based on the first UCI message. The second DCI message may indicate a second set of transmission parameters different than the first set of transmission parameters. For example, the second set of transmission parameters may indicate one or more CQIs, MCSs, RIs, beam indicators, L1-RSRP indicators, CRIs, TDRAs, or RB allocations that are different than corresponding parameters indicated by the first DCI message. In some examples, the UE 115-b may receive the second DCI based on a result of a decoding operation on the first DCI message. For example, the UE 115-b may determine one or more search spaces, aggregation levels, or downlink control channel candidates associated with the second DCI message based on a result of a decoding operation on the first DCI message and may receive the second DCI message based on the determined one or more of search spaces, aggregation levels, or downlink control channel candidates.

At 525, the UE 115-b may communicate with the base station 105-b using the second set of transmission parameters indicated by the second DCI message. That is, the UE 115-b may communicate with the base station 105-b based on the second DCI message. In some examples, the UE 115-b may communicate with the base station 105-b based on selecting an RB allocation from a set of RB allocations associated with a bitmap indicated by the semi-static control message. In some examples, the UE 115-b may transmit a second UCI message to the base station 105-b at 530. The UE 115-b may transmit the second UCI message to the base station 105-b on the uplink control channel.

The second UCI message may include one or more of a second feedback or a second CSI report. In some examples, the second UCI message may exclude the second CSI report based on a CSI report field in the second DCI message indicating that CSI reporting is disabled. The UE 115-b may transmit the second UCI message based on a CSI report field in the second DCI message indicating that CSI reporting is enabled. In some examples, the UE 115-b may select one or more transmission parameters indicated by either the first DCI message or the second DCI message and may indicate the selected one or more transmission parameters in the second CSI report. For example, the UE 115-b may select one or more of CQIs, MCSs, RIs, beam indicators, L1-RSRP indicators, CRIs, TDRAs, or RB allocations based on the first and second DCI messages and may indicate the one or more selected parameters in the second CSI report. The second CSI report may indicate a list of preferred transmission parameters associated with the second set of transmission parameters indicated by the second DCI message.

In some examples, the base station 105-b may transmit a third DCI message on the downlink control channel based on the first UCI or the second UCI. The third DCI message may indicate a third set of transmission parameters that are different than one or both of the first set of transmission parameters indicated by the first DCI message or the second set of transmission parameters indicated by the second DCI message. For example, the third DCI message may indicate one or more of a CQI, an MCS, an RI, a beam indicator, a L1-RSRP indicator, a CRI, a TDRA, or an RB allocation that are different than corresponding parameters indicated by one or both of the first DCI message or the second DCI message.

Figure 6:
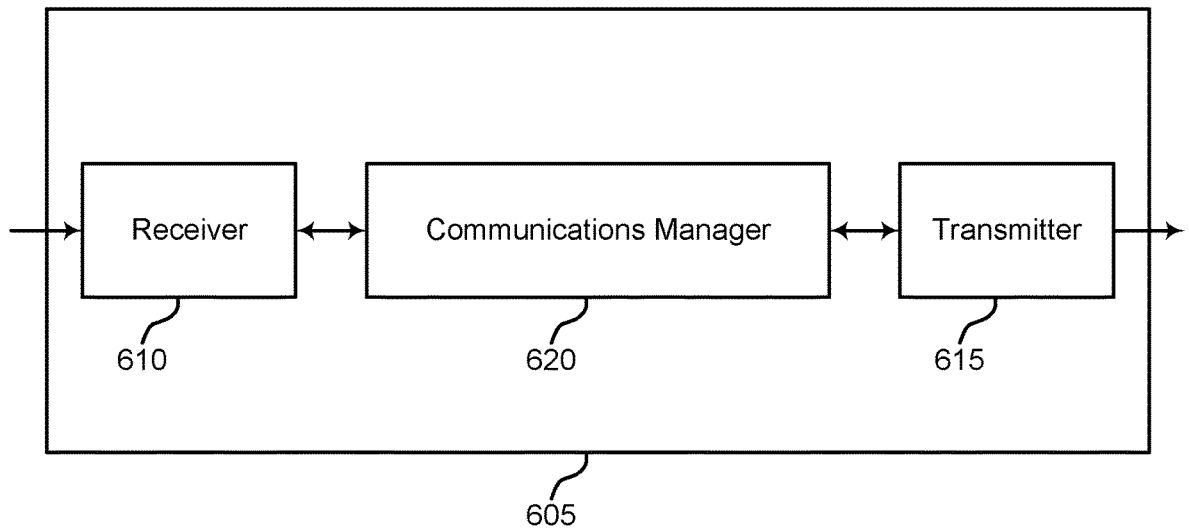
FIGS. 6 and 7 show block diagrams of devices that support multi-stage DCI for downlink transmissions in accordance with aspects of the present disclosure.

FIG. 6 shows a block diagram of a device 605 that supports multi-stage DCI for downlink transmissions in accordance with aspects of the present disclosure. The device 605 may be an example of aspects of a UE 115. The device 605 may include a receiver 610, a transmitter 615, and a communications manager 620. The communications manager 620 can be implemented, at least in part, by one or both of a modem and a processor. Each of these components may be in communication with one another (for example, via one or more buses).

The receiver 610 may provide a means for receiving information such as packets, user data, control information, or any combination thereof associated with various information channels (for example, control channels, data channels, information channels related to DCI for downlink transmissions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (for example, control channels, data channels, information channels related to DCI for downlink transmissions). In some examples, the transmitter 615 may be co-located with a receiver 610 in a transceiver component. The transmitter 615 may utilize a single antenna or a set of multiple antennas.

The communications manager 620, the receiver 610, the transmitter 615, or various combinations thereof or various components thereof may be examples of means for performing various aspects of DCI for downlink transmissions. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (for example, in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

In some examples, the communications manager 620 may be configured to perform various operations (for example, receiving, monitoring, transmitting) using or otherwise in cooperation with one or both of the receiver 610 or the transmitter 615. For example, the communications manager 620 may receive information from the receiver 610, send information to the transmitter 615, or be integrated in combination with one or both of the receiver 610 or the transmitter 615 to receive information, transmit information, or perform various other operations.

The communications manager 620 may support wireless communication at a UE in accordance with examples as disclosed herein. For example, the communications manager 620 may be configured as or otherwise support a means for receiving a first DCI message on a downlink control channel. The first DCI message including a first set of transmission parameters. The communications manager 620 may be configured as or otherwise support a means for transmitting a first UCI message on an uplink control channel based on the first DCI message. The first UCI message including a first feedback and a first CSI report.

The communications manager 620 may be configured as or otherwise support a means for receiving a second DCI message on the downlink control channel based on the first UCI message. The second DCI message including a second set of transmission parameters different than the first set of transmission parameters. The communications manager 620 may be configured as or otherwise support a means for communicating with a base station using the second set of transmission parameters.

By including or configuring the communications manager 620, the device 605 (for example, a processor controlling or otherwise coupled to one or more of the receiver 610, the transmitter 615, or the communications manager 620) may support techniques for reduced processing and reduced power consumption based on using a multi-stage DCI procedure to receive an initial transmission of a downlink transmission on PDSCH resources with improved reliability.

Figure 7:
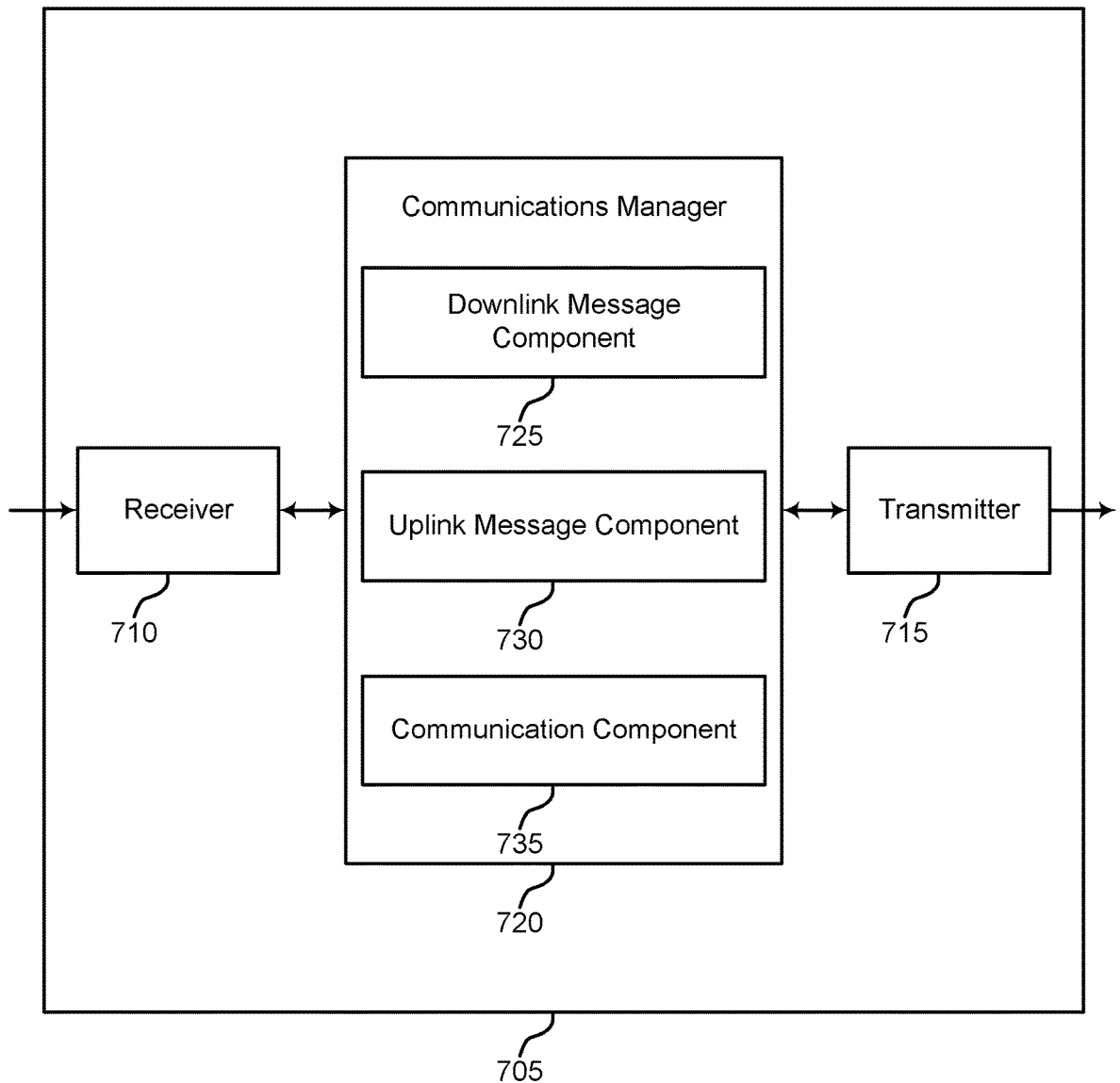

FIG. 7 shows a block diagram of a device 705 that supports multi-stage DCI for downlink transmissions in accordance with aspects of the present disclosure. The device 705 may be an example of aspects of a device 605 or a UE 115. The device 705 may include a receiver 710, a transmitter 715, and a communications manager 720. The communications manager 720 can be implemented, at least in part, by one or both of a modem and a processor. Each of these components may be in communication with one another (for example, via one or more buses).

The receiver 710 may provide a means for receiving information such as packets, user data, control information, or any combination thereof associated with various information channels (for example, control channels, data channels, information channels related to DCI for downlink transmissions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (for example, control channels, data channels, information channels related to DCI for downlink transmissions). In some examples, the transmitter 715 may be co-located with a receiver 710 in a transceiver component. The transmitter 715 may utilize a single antenna or a set of multiple antennas.

The device 705, or various components thereof, may be an example of means for performing various aspects of DCI for downlink transmissions. For example, the communications manager 720 may include a downlink message component 725, an uplink message component 730, a communication component 735, or any combination thereof. In some examples, the communications manager 720, or various components thereof, may be configured to perform various operations (for example, receiving, monitoring, transmitting) using or otherwise in cooperation with one or both of the receiver 710 or the transmitter 715. For example, the communications manager 720 may receive information from the receiver 710, send information to the transmitter 715, or be integrated in combination with one or both of the receiver 710 or the transmitter 715 to receive information, transmit information, or perform various other operations.

The communications manager 720 may support wireless communication at a UE in accordance with examples as disclosed herein. The downlink message component 725 may be configured as or otherwise support a means for receiving a first DCI message on a downlink control channel. The first DCI message including a first set of transmission parameters. The uplink message component 730 may be configured as or otherwise support a means for transmitting a first UCI message on an uplink control channel based on the first DCI message. The first UCI message including a first feedback and a first CSI report. The downlink message component 725 may be configured as or otherwise support a means for receiving a second DCI message on the downlink control channel based on the first UCI message, the second DCI message including a second set of transmission parameters different than the first set of transmission parameters. The communication component 735 may be configured as or otherwise support a means for communicating with a base station using the second set of transmission parameters.

Figure 8:
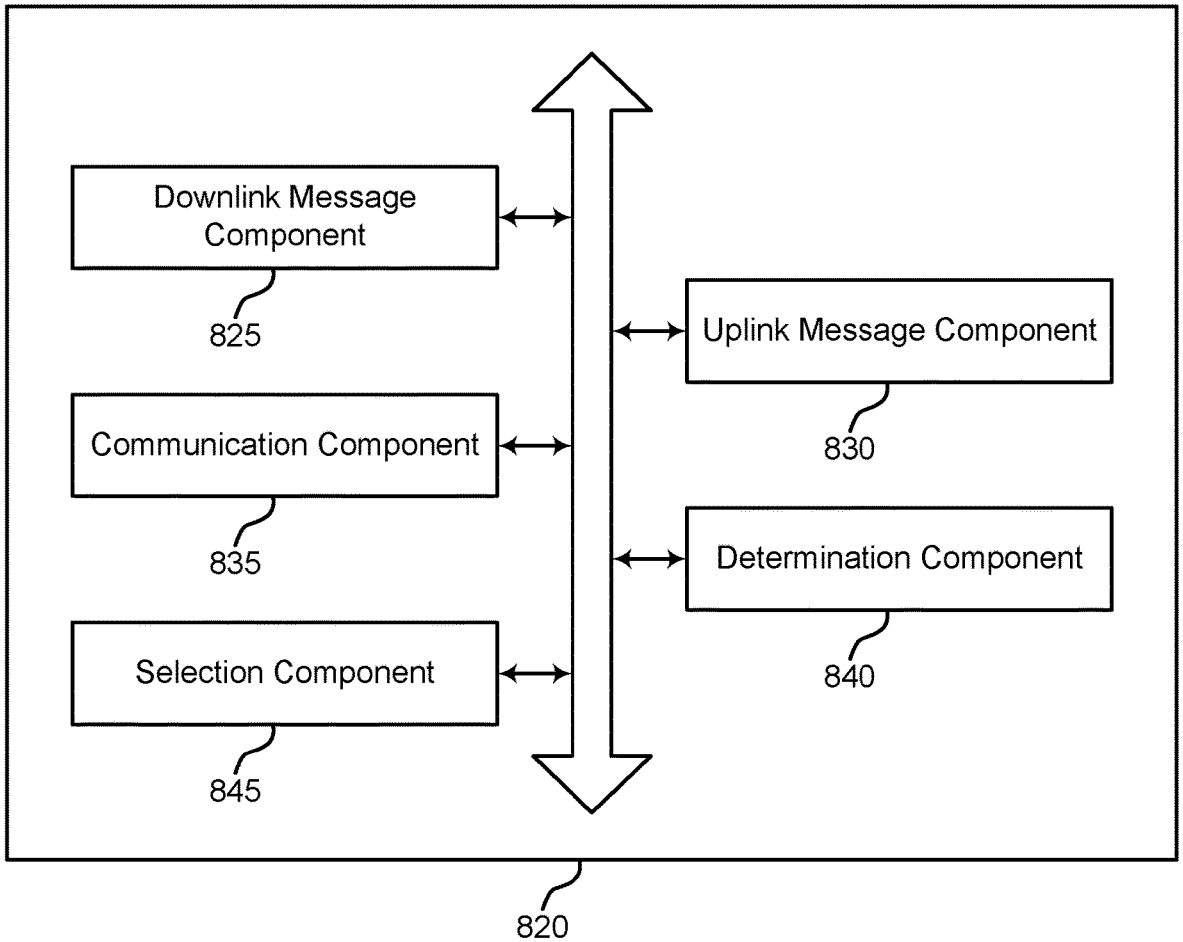
FIG. 8 shows a block diagram of a communications manager that supports multi-stage DCI for downlink transmissions in accordance with aspects of the present disclosure.

FIG. 8 shows a block diagram of a communications manager 820 that supports multi-stage DCI for downlink transmissions in accordance with aspects of the present disclosure. The communications manager 820, or various components thereof, may be an example of means for performing various aspects of DCI for downlink transmissions. For example, the communications manager 820 may include a downlink message component 825, an uplink message component 830, a communication component 835, a determination component 840, a selection component 845, or any combination thereof. Each of these components may communicate, directly or indirectly, with one another (for example, via one or more buses).

The communications manager 820 may support wireless communication at a UE in accordance with examples as disclosed herein. The downlink message component 825 may be configured as or otherwise support a means for receiving a first DCI message on a downlink control channel, the first DCI message including a first set of transmission parameters. The uplink message component 830 may be configured as or otherwise support a means for transmitting a first UCI message on an uplink control channel based on the first DCI message, the first UCI message including a first feedback and a first CSI report. In some examples, the downlink message component 825 may be configured as or otherwise support a means for receiving a second DCI message on the downlink control channel based on the first UCI message, the second DCI message including a second set of transmission parameters different than the first set of transmission parameters. The communication component 835 may be configured as or otherwise support a means for communicating with a base station using the second set of transmission parameters.

In some examples, the uplink message component 830 may be configured as or otherwise support a means for transmitting a second UCI message on the uplink control channel. The second UCI message including one or more of a second feedback or a second CSI report. The communication component 835 may be configured as or otherwise support a means for communicating with the base station based on the second UCI message. In some examples, the uplink message component 830 may be configured as or otherwise support a means for transmitting the second UCI message including one or more of the second feedback or the second CSI report based on a CSI report field in the second DCI message indicating that CSI reporting is enabled.

In some examples, the determination component 840 may be configured as or otherwise support a means for determining a set of DMRS configurations based on the first DCI message. In some examples, the selection component 845 may be configured as or otherwise support a means for selecting a DMRS configuration from the set of DMRS configurations. The second CSI report includes an indication of the DMRS configuration from the set of DMRS configurations. In some examples, the determination component 840 may be configured as or otherwise support a means for determining a set of RIS and a set of MCSs based on the first DCI message. In some examples, the selection component 845 may be configured as or otherwise support a means for selecting one or more of an RI from the set of RIs or an MCS from the set of MCSs, based on one or more of the RI or the MCS satisfying a criterion. The second CSI report includes an indication of one or more of the MCS or the RI.

The determination component 840 may be configured as or otherwise support a means for determining a set of RB allocations based on the first DCI message. In some examples, the selection component 845 may be configured as or otherwise support a means for selecting a RB allocation from the set of RB allocations, the RB allocation including one or more of a TDRA or a FDRA. The second CSI report includes an indication of the RB allocation. In some examples, the determination component 840 may be configured as or otherwise support a means for determining one or more of: a CQI indicator, an MCS, an RI, a beam indicator, a L1-RSRP indicator, or a CRI, based on the second DCI message. In some examples, the second CSI report includes one or more of: the CQI indicator, the MCS, the RI, the beam indicator, the L1-RSRP indicator, or the CRI indicator.

In some examples, the second CSI report includes the first set of transmission parameters and the second set of transmission parameters. In some examples, the second CSI report includes a list of preferred transmission parameters associated with the second set of transmission parameters, the second set of transmission parameters including one or more of a DMRS configuration, an MCS, an RI, a TDRA, or an RB allocation. In some examples, the second UCI message excludes the second CSI report based on a CSI report field in the second DCI message indicating that CSI reporting is disabled.

The downlink message component 825 may be configured as or otherwise support a means for receiving a semi-static control message including an indication of a transmission configuration. The semi-static control message including an RRC message or a MAC-CE message. The transmission configuration including one or more of the first set of transmission parameters or the second set of transmission parameters. In some examples, the selection component 845 may be configured as or otherwise support a means for selecting a RB allocation of a set of RB allocations based on a bitmap in the semi-static control message. One or more of the first set of transmission parameters or the second set of transmission parameters being associated with the RB allocation. The communication component 835 may be configured as or otherwise support a means for communicating with the base station based on the RB allocation.

In some examples, the determination component 840 may be configured as or otherwise support a means for determining first timing information based on the semi-static control message or the first DCI message. The first timing information including one or more of an ending symbol associated with the first DCI message in a time-domain, or a duration between the ending symbol associated with the first DCI message and a beginning symbol associated with the first UCI message in the time-domain. In some examples, the uplink message component 830 may be configured as or otherwise support a means for transmitting the first UCI message on the uplink control channel is based on the first timing information.

In some examples, the determination component 840 may be configured as or otherwise support a means for determining second timing information based on the semi-static control message or the first DCI message, the second timing information including one or more of a beginning symbol associated with a CSI-IM resource, or a duration between the beginning symbol associated with the CSI-IM resource and the beginning symbol associated with the first UCI message in the time-domain. In some examples, the uplink message component 830 may be configured as or otherwise support a means for transmitting the first UCI message on the uplink control channel is based on the first timing information and the second timing information. In some examples, the transmission configuration includes a TDRA configuration including one or more of the first timing information or the second timing information. In some examples, the first feedback includes an indication of a result of a decoding operation on the first DCI message. In some examples, receiving the second DCI message on the downlink control channel is based on the result of the decoding operation on the first DCI message.

In some examples, the determination component 840 may be configured as or otherwise support a means for determining an uplink control channel resource identifier based on the first DCI message. In some examples, the determination component 840 may be configured as or otherwise support a means for determining one or more of: a beginning symbol associated with the first UCI message, a number of symbols associated with the first UCI message, a starting RB associated with the first UCI message, or a number of RBs associated with the first UCI message. In some examples, the uplink message component 830 may be configured as or otherwise support a means for transmitting the first UCI message on the uplink control channel is based on one or more of: the beginning symbol associated with the first UCI message, the number of symbols associated with the first UCI message, the starting RB associated with the first UCI message, or the number of RBs associated with the first UCI message.

In some examples, the determination component 840 may be configured as or otherwise support a means for determining an offset in a time-domain between an ending symbol associated with the first DCI message and a beginning symbol associated with the first UCI message. In some examples, the determination component 840 may be configured as or otherwise support a means for determining one or more resources to transmit the first UCI message based on determining the offset in the time-domain. In some examples, the uplink message component 830 may be configured as or otherwise support a means for transmitting the first UCI message on the uplink control channel based on determining the one or more resources.

In some examples, the determination component 840 may be configured as or otherwise support a means for determining one or more of: a search space associated with the second DCI message, an aggregation level associated with the second DCI message, or a downlink control channel candidate associated with the second DCI message, based on the first DCI message. In some examples, the downlink message component 825 may be configured as or otherwise support a means for receiving the second DCI message based on one or more of the search space associated with the second DCI message, the aggregation level associated with the second DCI message, or the downlink control channel candidate associated with the second DCI message.

In some examples, the downlink message component 825 may be configured as or otherwise support a means for receiving a third DCI message on the downlink control channel based on one or more of the first UCI message or transmitting a second UCI message in response to the second DCI message. The third DCI message including a third set of transmission parameters different than one or both of the first set of transmission parameters or the second set of transmission parameters. The communication component 835 may be configured as or otherwise support a means for communicating with the base station based at last in part on the third DCI message.

Figure 9:
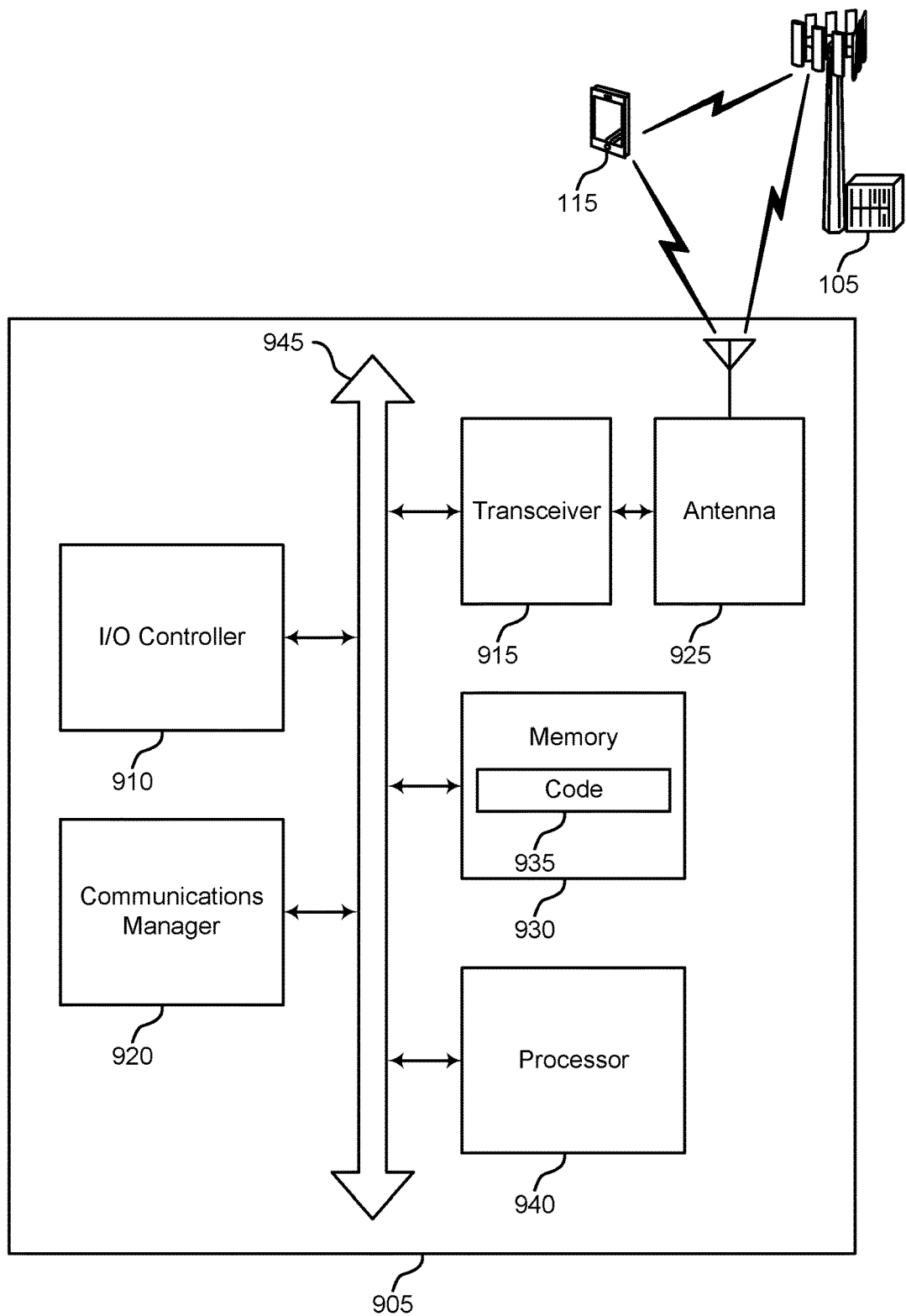
FIG. 9 shows a diagram of a system including a device that supports multi-stage DCI for downlink transmissions in accordance with aspects of the present disclosure.

FIG. 9 shows a diagram of a system including a device 905 that supports multi-stage DCI for downlink transmissions in accordance with aspects of the present disclosure. The device 905 may be an example of or include the components of a device 605, a device 705, or a UE 115. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (for example, operatively, communicatively, functionally, electronically, electrically) via one or more buses (for example, a bus 945).

The I/O controller 910 may manage input and output signals for the device 905. The I/O controller 910 may also manage peripherals not integrated into the device 905. In some examples, the I/O controller 910 may represent a physical connection or port to an external peripheral. In some examples, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some examples, the I/O controller 910 may be implemented as part of a processor, such as the processor 940. In some examples, a user may interact with the device 905 via the I/O controller 910 or via hardware components controlled by the I/O controller 910.

In some examples, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof.

The memory 930 may include random access memory (RAM) and read-only memory (ROM). The memory 930 may store computer-readable, computer-executable code 935 including instructions that, if executed by the processor 940, cause the device 905 to perform various functions described herein. The code 935 may be stored in a non-transitory computer-readable medium such as system memory or another type of memory. In some examples, the code 935 may not be directly executable by the processor 940 but may cause a computer (for example, if compiled and executed) to perform functions described herein. In some examples, the memory 930 may contain, among other things, a basic I/O system (BIOS), which may control basic hardware or software operation such as the interaction with peripheral components or devices.

The processor 940 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 940 may be configured to operate a memory array using a memory controller. In some other cases, a memory controller may be integrated into the processor 940. The processor 940 may be configured to execute computer-readable instructions stored in a memory (for example, the memory 930) to cause the device 905 to perform various functions (for example, functions or tasks supporting DCI for downlink transmissions). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving a first DCI message on a downlink control channel. The first DCI message including a first set of transmission parameters. The communications manager 920 may be configured as or otherwise support a means for transmitting a first UCI message on an uplink control channel based on the first DCI message. The first UCI message including a first feedback and a first CSI report.

The communications manager 920 may be configured as or otherwise support a means for receiving a second DCI message on the downlink control channel based on the first UCI message. The second DCI message including a second set of transmission parameters different than the first set of transmission parameters. The communications manager 920 may be configured as or otherwise support a means for communicating with a base station using the second set of transmission parameters. By including or configuring the communications manager 920, the device 905 may support techniques for improved reliability and reduced latency based on using a multi-stage DCI procedure to receive an initial transmission of a downlink transmission on PDSCH resources with increased reliability.

In some examples, the communications manager 920 may be configured to perform various operations (for example, receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of DCI for downlink transmissions, or the processor 940 and the memory 930 may be otherwise configured to perform or support such operations.

Figure 10:
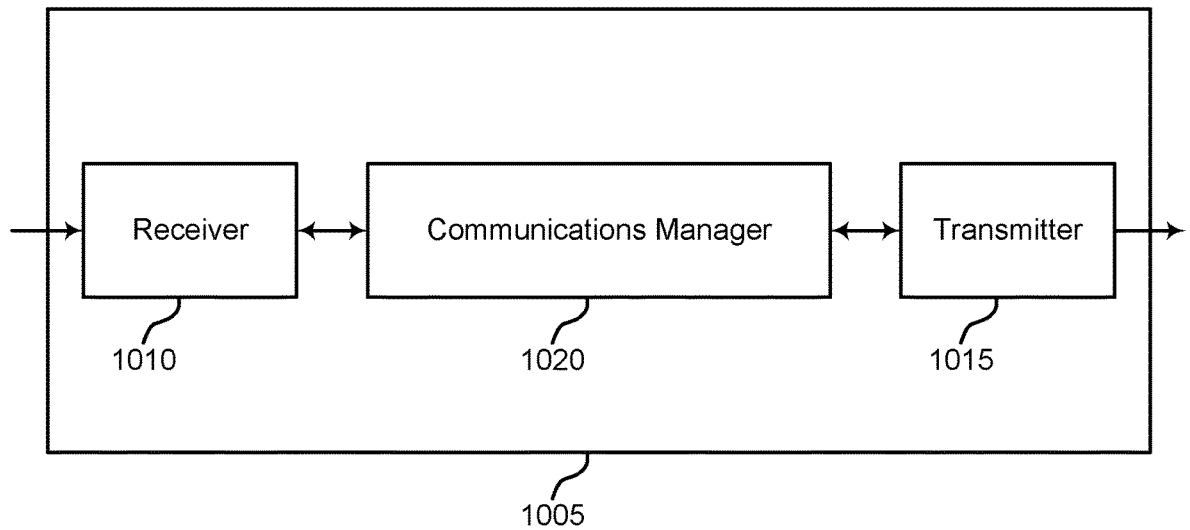
FIGS. 10 and 11 show block diagrams of devices that support multi-stage DCI for downlink transmissions in accordance with aspects of the present disclosure.

FIG. 10 shows a block diagram of a device 1005 that supports multi-stage DCI for downlink transmissions in accordance with aspects of the present disclosure. The device 1005 may be an example of aspects of a base station 105. The device 1005 may include a receiver 1010, a transmitter 1015, and a communications manager 1020. The communications manager 1020 can be implemented, at least in part, by one or both of a modem and a processor. Each of these components may be in communication with one another (for example, via one or more buses).

The receiver 1010 may provide a means for receiving information such as packets, user data, control information, or any combination thereof associated with various information channels (for example, control channels, data channels, information channels related to DCI for downlink transmissions). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (for example, control channels, data channels, information channels related to DCI for downlink transmissions). In some examples, the transmitter 1015 may be co-located with a receiver 1010 in a transceiver component. The transmitter 1015 may utilize a single antenna or a set of multiple antennas.

The communications manager 1020, the receiver 1010, the transmitter 1015, or various combinations thereof or various components thereof may be examples of means for performing various aspects of DCI for downlink transmissions. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (for example, in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

In some examples, the communications manager 1020 may be configured to perform various operations (for example, receiving, monitoring, transmitting) using or otherwise in cooperation with one or both of the receiver 1010 or the transmitter 1015. For example, the communications manager 1020 may receive information from the receiver 1010, send information to the transmitter 1015, or be integrated in combination with one or both of the receiver 1010 or the transmitter 1015 to receive information, transmit information, or perform various other operations.

The communications manager 1020 may support wireless communication at a base station in accordance with examples as disclosed herein. For example, the communications manager 1020 may be configured as or otherwise support a means for transmitting a first DCI message on a downlink control channel. The first DCI message including a first set of transmission parameters. The communications manager 1020 may be configured as or otherwise support a means for receiving a first UCI message on an uplink control channel based on the first DCI message. The first UCI message including a first feedback and a first CSI report.

The communications manager 1020 may be configured as or otherwise support a means for transmitting a second DCI message on the downlink control channel based on the first UCI message. The second DCI message including a second set of transmission parameters different than the first set of transmission parameters. The communications manager 1020 may be configured as or otherwise support a means for communicating with a UE based on the second set of transmission parameters.

By including or configuring the communications manager 1020, the device 1005 (for example, a processor controlling or otherwise coupled to one or more of the receiver 1010, the transmitter 1015, or the communications manager 1020) may support techniques for reduced processing and reduced power consumption based on using a multi-stage DCI procedure to transmit an initial transmission of a downlink transmission on PDSCH resources with improved reliability.

Figure 11:
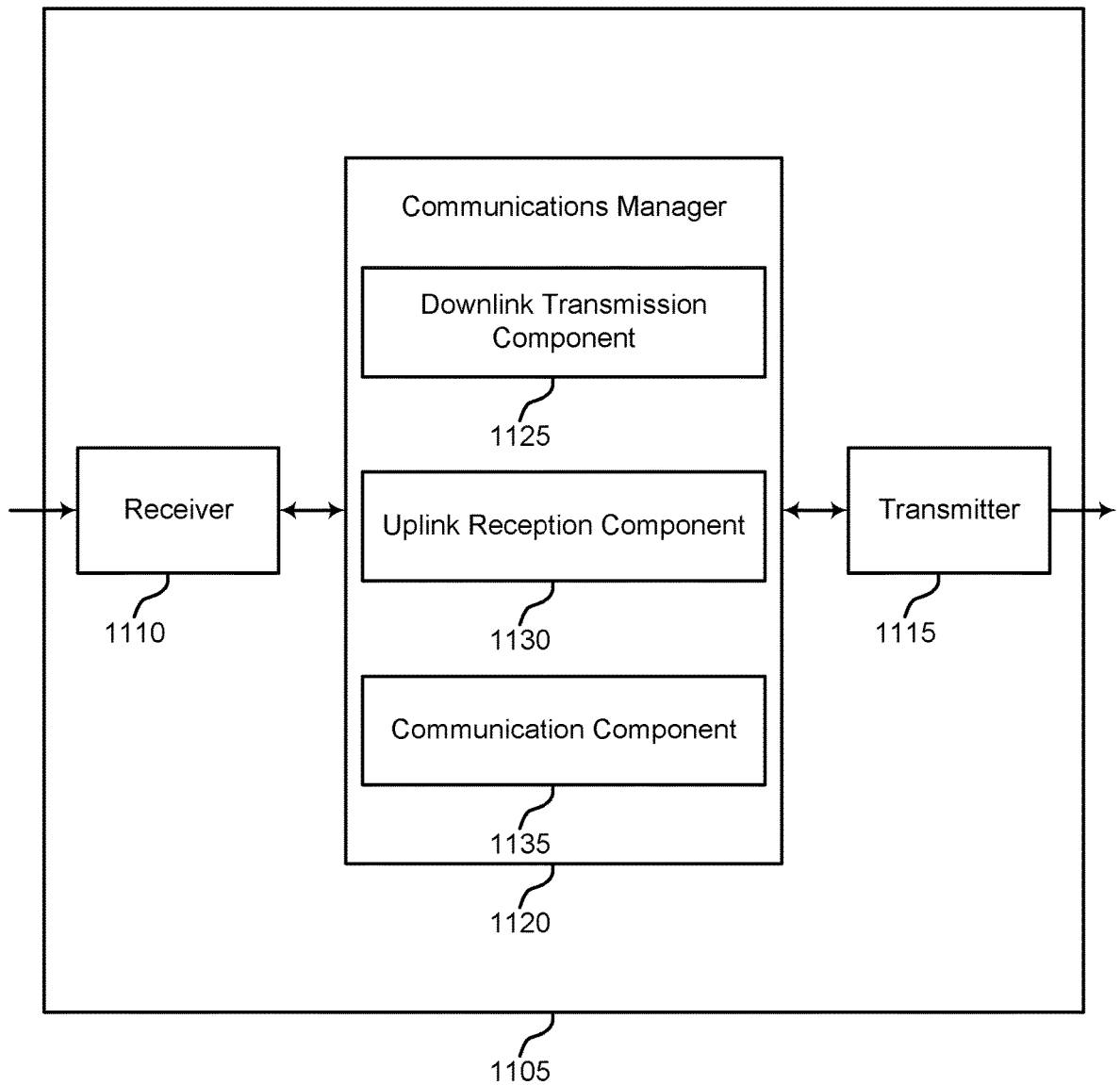

FIG. 11 shows a block diagram of a device 1105 that supports multi-stage DCI for downlink transmissions in accordance with aspects of the present disclosure. The device 1105 may be an example of aspects of a device 1005 or a base station 105. The device 1105 may include a receiver 1110, a transmitter 1115, and a communications manager 1120. The communications manager 1120 can be implemented, at least in part, by one or both of a modem and a processor. Each of these components may be in communication with one another (for example, via one or more buses).

The receiver 1110 may provide a means for receiving information such as packets, user data, control information, or any combination thereof associated with various information channels (for example, control channels, data channels, information channels related to DCI for downlink transmissions). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (for example, control channels, data channels, information channels related to DCI for downlink transmissions). In some examples, the transmitter 1115 may be co-located with a receiver 1110 in a transceiver component. The transmitter 1115 may utilize a single antenna or a set of multiple antennas.

The device 1105, or various components thereof, may be an example of means for performing various aspects of DCI for downlink transmissions. For example, the communications manager 1120 may include a downlink transmission component 1125, an uplink reception component 1130, a communication component 1135, or any combination thereof. In some examples, the communications manager 1120, or various components thereof, may be configured to perform various operations (for example, receiving, monitoring, transmitting) using or otherwise in cooperation with one or both of the receiver 1110 or the transmitter 1115. For example, the communications manager 1120 may receive information from the receiver 1110, send information to the transmitter 1115, or be integrated in combination with one or both of the receiver 1110 or the transmitter 1115 to receive information, transmit information, or perform various other operations.

The communications manager 1120 may support wireless communication at a base station in accordance with examples as disclosed herein. The downlink transmission component 1125 may be configured as or otherwise support a means for transmitting a first DCI message on a downlink control channel. The first DCI message including a first set of transmission parameters. The uplink reception component 1130 may be configured as or otherwise support a means for receiving a first UCI message on an uplink control channel based on the first DCI message. The first UCI message including a first feedback and a first CSI report. The downlink transmission component 1125 may be configured as or otherwise support a means for transmitting a second DCI message on the downlink control channel based on the first UCI message. The second DCI message including a second set of transmission parameters different than the first set of transmission parameters. The communication component 1135 may be configured as or otherwise support a means for communicating with a UE based on the second set of transmission parameters.

Figure 12:
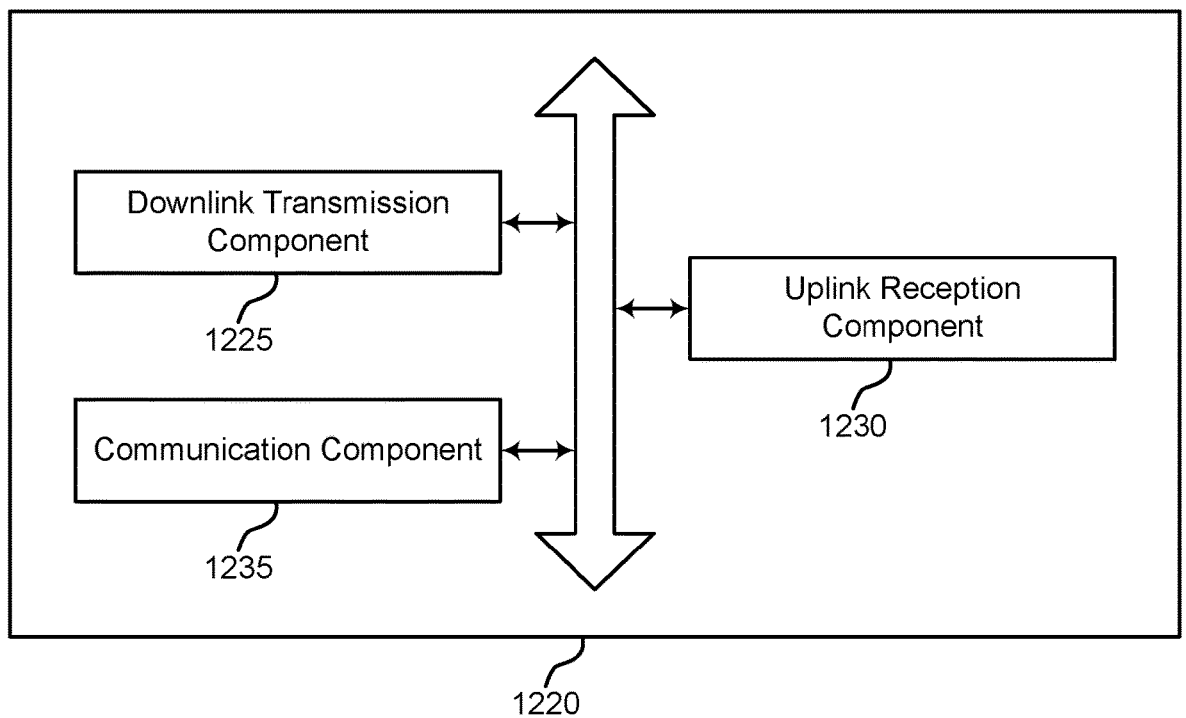
FIG. 12 shows a block diagram of a communications manager that supports multi-stage DCI for downlink transmissions in accordance with aspects of the present disclosure.

FIG. 12 shows a block diagram of a communications manager 1220 that supports multi-stage DCI for downlink transmissions in accordance with aspects of the present disclosure. The communications manager 1220, or various components thereof, may be an example of means for performing various aspects of DCI for downlink transmissions. For example, the communications manager 1220 may include a downlink transmission component 1225, an uplink reception component 1230, a communication component 1235, or any combination thereof. Each of these components may communicate, directly or indirectly, with one another (for example, via one or more buses).

The communications manager 1220 may support wireless communication at a base station in accordance with examples as disclosed herein. The downlink transmission component 1225 may be configured as or otherwise support a means for transmitting a first DCI message on a downlink control channel. The first DCI message including a first set of transmission parameters. The uplink reception component 1230 may be configured as or otherwise support a means for receiving a first UCI message on an uplink control channel based on the first DCI message. The first UCI message including a first feedback and a first CSI report. In some examples, the downlink transmission component 1225 may be configured as or otherwise support a means for transmitting a second DCI message on the downlink control channel based on the first UCI message. The second DCI message including a second set of transmission parameters different than the first set of transmission parameters. The communication component 1235 may be configured as or otherwise support a means for communicating with a UE based on the second set of transmission parameters.

The uplink reception component 1230 may be configured as or otherwise support a means for receiving a second UCI message on the uplink control channel. The second UCI message including one or more of a second feedback or a second CSI report. The communication component 1235 may be configured as or otherwise support a means for communicating with the UE based on the second UCI message. In some examples, the uplink reception component 1230 may be configured as or otherwise support a means for receiving the second UCI message including one or more of the second feedback or the second CSI report based on a CSI report field in the second DCI message indicating that CSI reporting is enabled. In some examples, the second CSI report includes the first set of transmission parameters and the second set of transmission parameters. In some examples, the second CSI report includes a list of preferred transmission parameters associated with the second set of transmission parameters, the second set of transmission parameters including one or more of a DMRS configuration, an MCS, an RI, a TDRA, or an RB allocation.

The downlink transmission component 1225 may be configured as or otherwise support a means for transmitting a semi-static control message including an indication of a transmission configuration, the semi-static control message including an RRC message or a MAC-CE message, the transmission configuration including one or more of the first set of transmission parameters or the second set of transmission parameters. The communication component 1235 may be configured as or otherwise support a means for communicating with the UE based on the semi-static control message. In some examples, the transmission configuration includes a TDRA configuration including one or more of an ending symbol associated with the first DCI message in a time-domain, a duration between the ending symbol associated with the first DCI message and a beginning symbol associated with the first UCI message in the time-domain, a beginning symbol associated with a CSI-IM resource, or a duration between the beginning symbol associated with the CSI-IM resource and the beginning symbol associated with the first UCI message in the time-domain.

Figure 13:
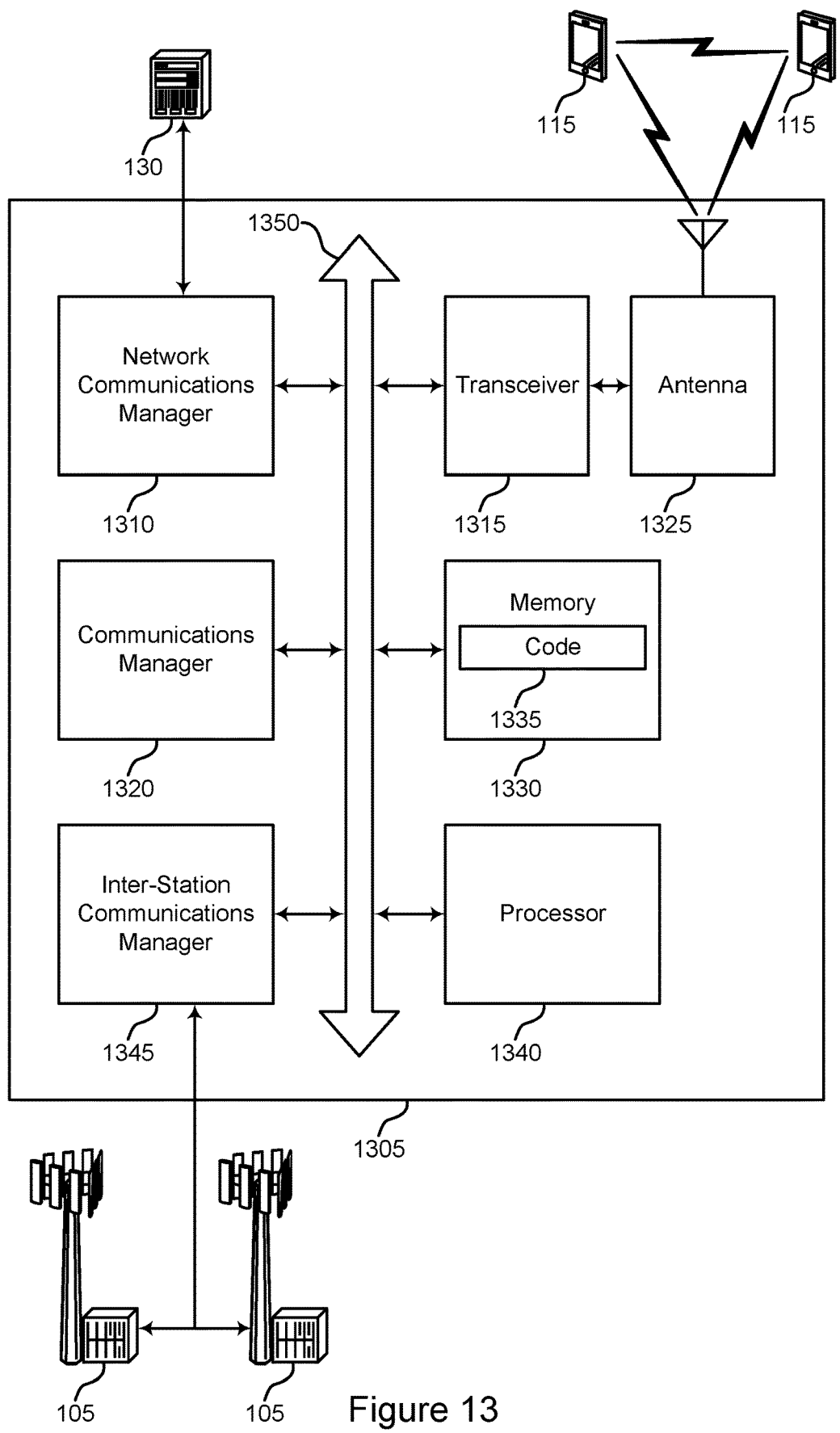
FIG. 13 shows a diagram of a system including a device that supports multi-stage DCI for downlink transmissions in accordance with aspects of the present disclosure.

FIG. 13 shows a diagram of a system including a device 1305 that supports multi-stage DCI for downlink transmissions in accordance with aspects of the present disclosure. The device 1305 may be an example of or include the components of a device 1005, a device 1105, or a base station 105. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (for example, operatively, communicatively, functionally, electronically, electrically) via one or more buses (for example, a bus 1350).

The network communications manager 1310 may manage communications with a core network 130 (for example, via one or more wired backhaul links). For example, the network communications manager 1310 may manage the transfer of data communications for client devices, such as one or more UEs 115.

In some examples, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof.

The memory 1330 may include RAM and ROM. The memory 1330 may store computer-readable, computer-executable code 1335 including instructions that, if executed by the processor 1340, cause the device 1305 to perform various functions described herein. The code 1335 may be stored in a non-transitory computer-readable medium such as system memory or another type of memory. In some examples, the code 1335 may not be directly executable by the processor 1340 but may cause a computer (for example, if compiled and executed) to perform functions described herein. In some examples, the memory 1330 may contain, among other things, a BIOS may control basic hardware or software operation, such as the interaction with peripheral components or devices.

The processor 1340 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1340 may be configured to operate a memory array using a memory controller. In some other cases, a memory controller may be integrated into the processor 1340. The processor 1340 may be configured to execute computer-readable instructions stored in a memory (for example, the memory 1330) to cause the device 1305 to perform various functions (for example, functions or tasks supporting DCI for downlink transmissions). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for transmitting a first DCI message on a downlink control channel. The first DCI message including a first set of transmission parameters. The communications manager 1320 may be configured as or otherwise support a means for receiving a first UCI message on an uplink control channel based on the first DCI message. The first UCI message including a first feedback and a first CSI report. The communications manager 1320 may be configured as or otherwise support a means for transmitting a second DCI message on the downlink control channel based on the first UCI message. The second DCI message including a second set of transmission parameters different than the first set of transmission parameters. The communications manager 1320 may be configured as or otherwise support a means for communicating with a UE based on the second set of transmission parameters. By including or configuring the communications manager 1320, the device 1305 may support techniques for improved communication reliability and reduced latency based on using a multi-stage DCI procedure to transmit an initial transmission of a downlink transmission on PDSCH resources with improved reliability.

In some examples, the communications manager 1320 may be configured to perform various operations (for example, receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of DCI for downlink transmissions, or the processor 1340 and the memory 1330 may be otherwise configured to perform or support such operations.

Figure 14:
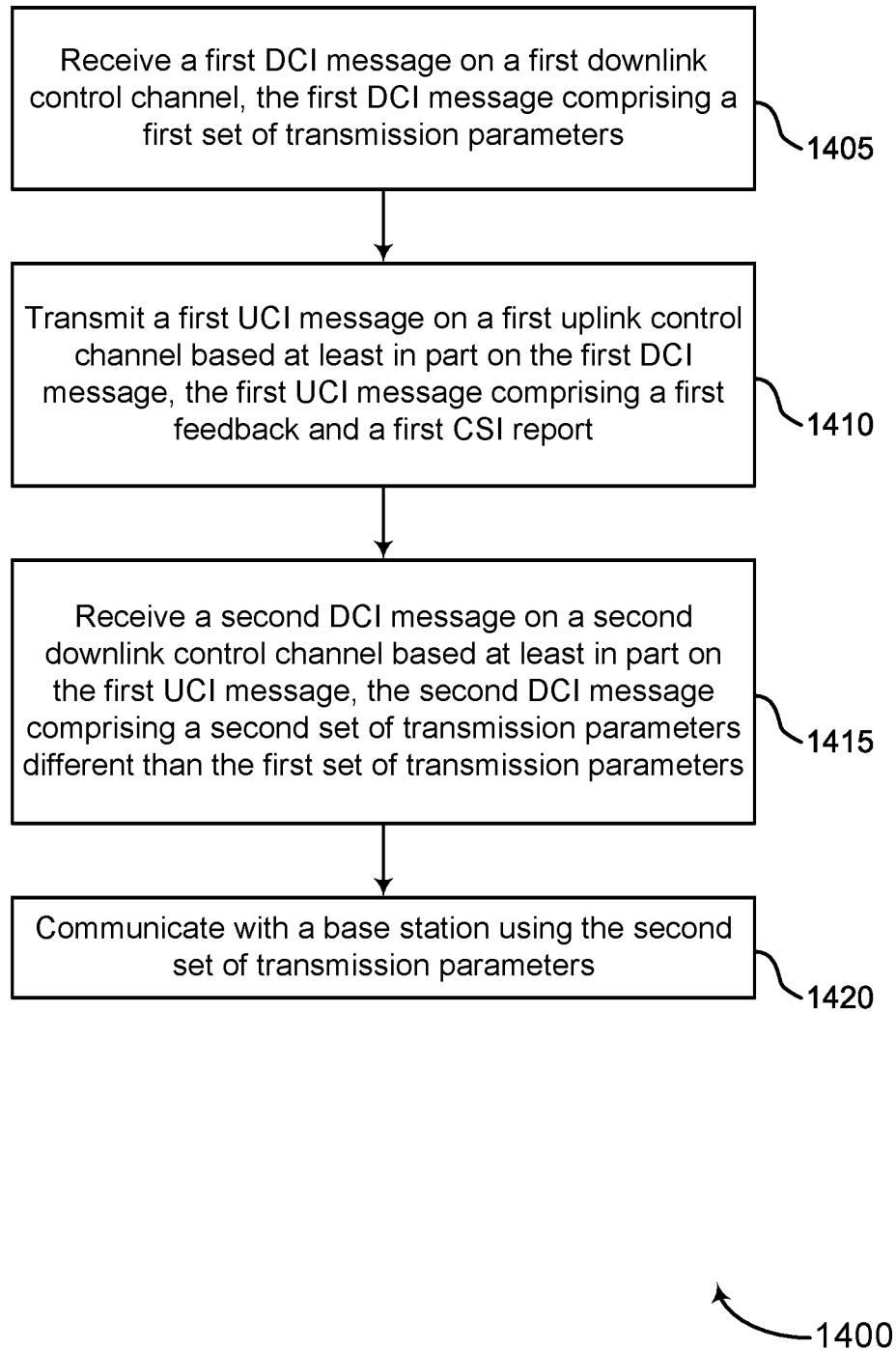
FIGS. 14-17 show flowcharts illustrating methods that support multi-stage DCI for downlink transmissions in accordance with aspects of the present disclosure.

FIG. 14 shows a flowchart illustrating a method 1400 that supports multi-stage DCI for downlink transmissions in accordance with aspects of the present disclosure. The operations of the method 1400 may be implemented by a UE or its components. For example, the operations of the method 1400 may be performed by a UE 115 as described with reference to FIGS. 1-9. In some examples, a UE may execute a set of instructions to control the functional elements of the UE to perform the described functions. Additionally or alternatively, the UE may perform aspects of the described functions using special-purpose hardware.

At 1405, the method may include receiving a first DCI message on a first downlink control channel, the first DCI message including a first set of transmission parameters. The operations of 1405 may be performed in accordance with examples as disclosed herein. In some examples, aspects of the operations of 1405 may be performed by a downlink message component 825 as described with reference to FIG. 8.

At 1410, the method may include transmitting a first UCI message on a first uplink control channel based on the first DCI message, the first UCI message including a first feedback and a first CSI report. The operations of 1410 may be performed in accordance with examples as disclosed herein. In some examples, aspects of the operations of 1410 may be performed by an uplink message component 830 as described with reference to FIG. 8.

At 1415, the method may include receiving a second DCI message on a second downlink control channel based on the first UCI message, the second DCI message including a second set of transmission parameters different than the first set of transmission parameters. The operations of 1415 may be performed in accordance with examples as disclosed herein. In some examples, aspects of the operations of 1415 may be performed by a downlink message component 825 as described with reference to FIG. 8.

At 1420, the method may include communicating with a base station using the second set of transmission parameters. The operations of 1420 may be performed in accordance with examples as disclosed herein. In some examples, aspects of the operations of 1420 may be performed by a communication component 835 as described with reference to FIG. 8.

Figure 15:
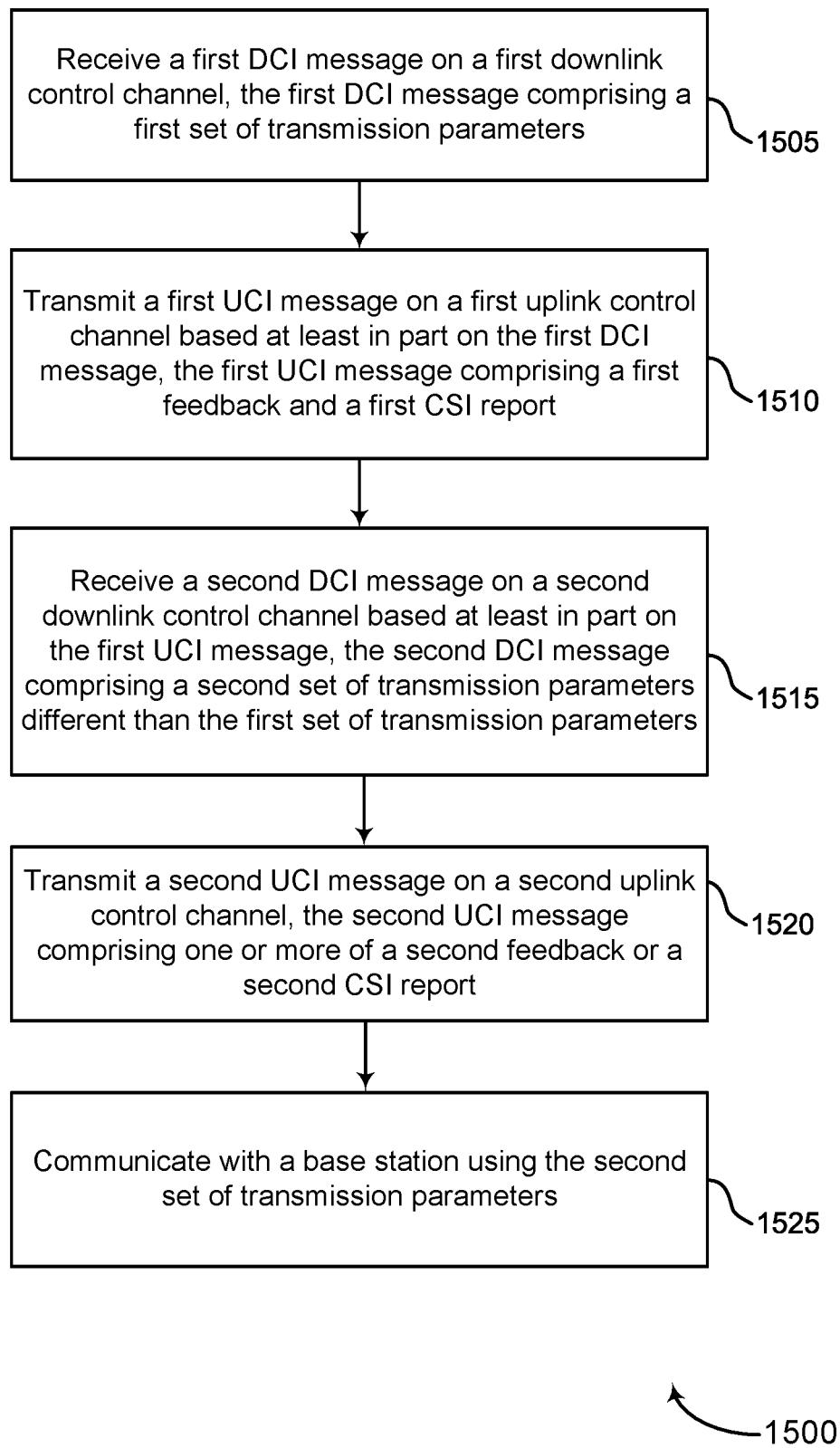

FIG. 15 shows a flowchart illustrating a method 1500 that supports multi-stage DCI for downlink transmissions in accordance with aspects of the present disclosure. The operations of the method 1500 may be implemented by a UE or its components. For example, the operations of the method 1500 may be performed by a UE 115 as described with reference to FIGS. 1-9. In some examples, a UE may execute a set of instructions to control the functional elements of the UE to perform the described functions. Additionally or alternatively, the UE may perform aspects of the described functions using special-purpose hardware.

At 1505, the method may include receiving a first DCI message on a first downlink control channel, the first DCI message including a first set of transmission parameters. The operations of 1505 may be performed in accordance with examples as disclosed herein. In some examples, aspects of the operations of 1505 may be performed by a downlink message component 825 as described with reference to FIG. 8.

At 1510, the method may include transmitting a first UCI message on a first uplink control channel based on the first DCI message, the first UCI message including a first feedback and a first CSI report. The operations of 1510 may be performed in accordance with examples as disclosed herein. In some examples, aspects of the operations of 1510 may be performed by an uplink message component 830 as described with reference to FIG. 8.

At 1515, the method may include receiving a second DCI message on a second downlink control channel based on the first UCI message, the second DCI message including a second set of transmission parameters different than the first set of transmission parameters. The operations of 1515 may be performed in accordance with examples as disclosed herein. In some examples, aspects of the operations of 1515 may be performed by a downlink message component 825 as described with reference to FIG. 8.

At 1520, the method may include transmitting a second UCI message on the uplink control channel, the second UCI message including one or more of a second feedback or a second CSI report. The operations of 1520 may be performed in accordance with examples as disclosed herein. In some examples, aspects of the operations of 1520 may be performed by an uplink message component 830 as described with reference to FIG. 8.

At 1525, the method may include communicating with a base station using the second set of transmission parameters. The operations of 1525 may be performed in accordance with examples as disclosed herein. In some examples, aspects of the operations of 1525 may be performed by a communication component 835 as described with reference to FIG. 8.

Figure 16:
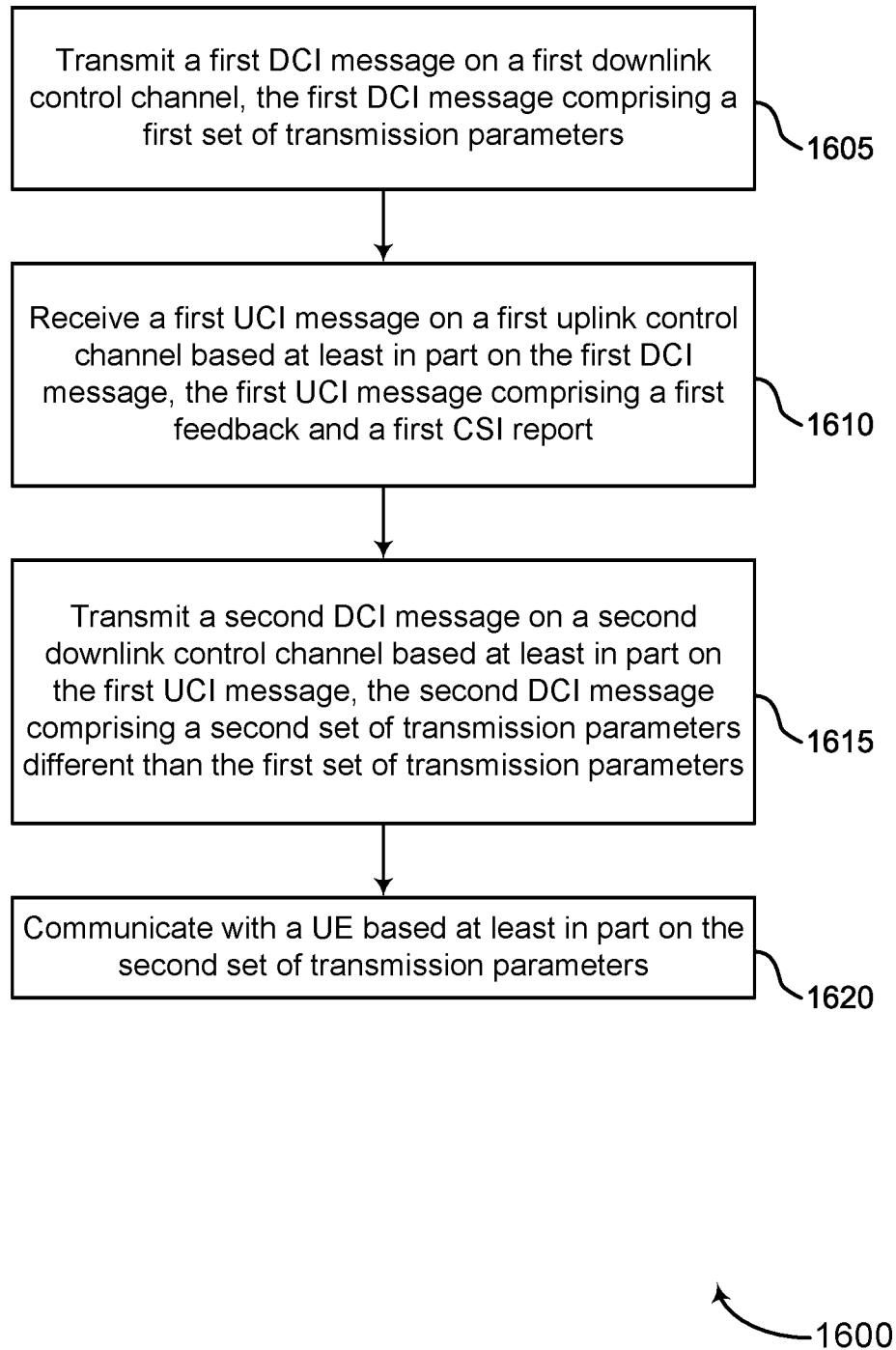

FIG. 16 shows a flowchart illustrating a method 1600 that supports multi-stage DCI for downlink transmissions in accordance with aspects of the present disclosure. The operations of the method 1600 may be implemented by a base station or its components. For example, the operations of the method 1600 may be performed by a base station 105 as described with reference to FIGS. 1-5 and 10-13. In some examples, a base station may execute a set of instructions to control the functional elements of the base station to perform the described functions. Additionally or alternatively, the base station may perform aspects of the described functions using special-purpose hardware.

At 1605, the method may include transmitting a first DCI message on a first downlink control channel, the first DCI message including a first set of transmission parameters. The operations of 1605 may be performed in accordance with examples as disclosed herein. In some examples, aspects of the operations of 1605 may be performed by a downlink transmission component 1225 as described with reference to FIG. 12.

At 1610, the method may include receiving a first UCI message on a first uplink control channel based on the first DCI message, the first UCI message including a first feedback and a first CSI report. The operations of 1610 may be performed in accordance with examples as disclosed herein. In some examples, aspects of the operations of 1610 may be performed by an uplink reception component 1230 as described with reference to FIG. 12.

At 1615, the method may include transmitting a second DCI message on a second downlink control channel based on the first UCI message, the second DCI message including a second set of transmission parameters different than the first set of transmission parameters. The operations of 1615 may be performed in accordance with examples as disclosed herein. In some examples, aspects of the operations of 1615 may be performed by a downlink transmission component 1225 as described with reference to FIG. 12.

At 1620, the method may include communicating with a UE based on the second set of transmission parameters. The operations of 1620 may be performed in accordance with examples as disclosed herein. In some examples, aspects of the operations of 1620 may be performed by a communication component 1235 as described with reference to FIG. 12.

Figure 17:
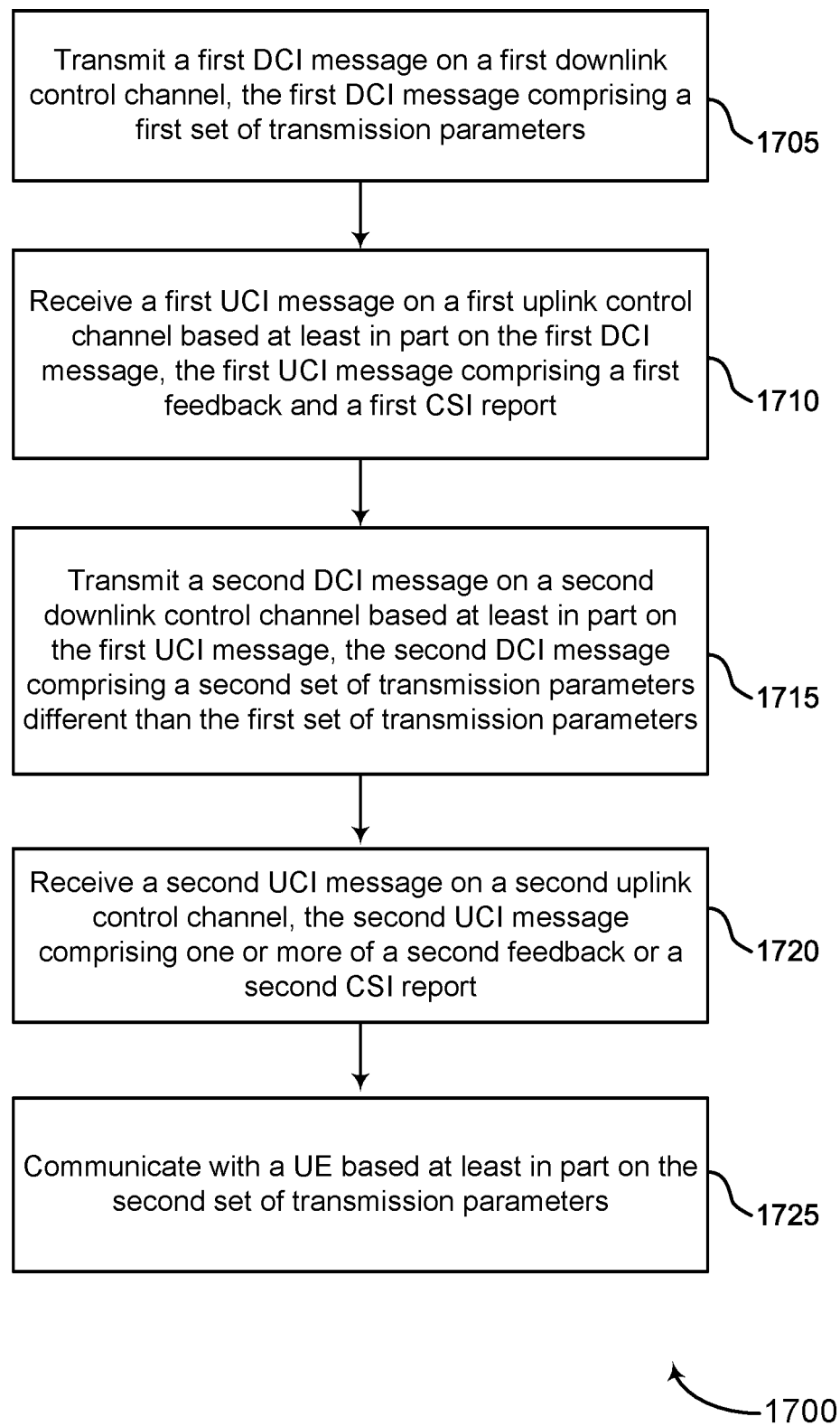

FIG. 17 shows a flowchart illustrating a method 1700 that supports multi-stage DCI for downlink transmissions in accordance with aspects of the present disclosure. The operations of the method 1700 may be implemented by a base station or its components. For example, the operations of the method 1700 may be performed by a base station 105 as described with reference to FIGS. 1-5 and 10-13. In some examples, a base station may execute a set of instructions to control the functional elements of the base station to perform the described functions. Additionally or alternatively, the base station may perform aspects of the described functions using special-purpose hardware.

At 1705, the method may include transmitting a first DCI message on a first downlink control channel, the first DCI message including a first set of transmission parameters. The operations of 1705 may be performed in accordance with examples as disclosed herein. In some examples, aspects of the operations of 1705 may be performed by a downlink transmission component 1225 as described with reference to FIG. 12.

At 1710, the method may include receiving a first UCI message on a first uplink control channel based on the first DCI message, the first UCI message including a first feedback and a first CSI report. The operations of 1710 may be performed in accordance with examples as disclosed herein. In some examples, aspects of the operations of 1710 may be performed by an uplink reception component 1230 as described with reference to FIG. 12.

At 1715, the method may include transmitting a second DCI message on a second downlink control channel based on the first UCI message, the second DCI message including a second set of transmission parameters different than the first set of transmission parameters. The operations of 1715 may be performed in accordance with examples as disclosed herein. In some examples, aspects of the operations of 1715 may be performed by a downlink transmission component 1225 as described with reference to FIG. 12.

At 1720, the method may include receiving a second UCI message on a second uplink control channel, the second UCI message including one or more of a second feedback or a second CSI report. The operations of 1720 may be performed in accordance with examples as disclosed herein. In some examples, aspects of the operations of 1720 may be performed by an uplink reception component 1230 as described with reference to FIG. 12.

At 1725, the method may include communicating with a UE based on the second set of transmission parameters. The operations of 1725 may be performed in accordance with examples as disclosed herein. In some examples, aspects of the operations of 1725 may be performed by a communication component 1235 as described with reference to FIG. 12.

The following provides an overview of aspects of the present disclosure:

Aspect 1: A method for wireless communication at a UE, comprising: receiving a first DCI message on a first downlink control channel, the first DCI message comprising a first set of transmission parameters; transmitting a first UCI message on a first uplink control channel based at least in part on the first DCI message, the first UCI message comprising a first feedback and a first CSI report; receiving a second DCI message on a second downlink control channel based at least in part on the first UCI message, the second DCI message comprising a second set of transmission parameters different than the first set of transmission parameters; and communicating with a base station using the second set of transmission parameters.

Aspect 2: The method of aspect 1, further comprising: transmitting a second UCI message on a second uplink control channel, the second UCI message comprising one or more of a second feedback or a second CSI report, wherein communicating with the base station is based at least in part on the second UCI message.

Aspect 3: The method of aspect 2, wherein transmitting the second UCI message comprising one or more of the second feedback or the second CSI report is based at least in part on a CSI report field in the second DCI message indicating that CSI reporting is enabled.

Aspect 4: The method of any of aspects 2 through 3, further comprising: determining a set of DMRS configurations based at least in part on the first DCI message; and selecting a DMRS configuration from the set of DMRS configurations, wherein the second CSI report comprises an indication of the DMRS configuration from the set of DMRS configurations.

Aspect 5: The method of any of aspects 2 through 4, further comprising: determining a set of RIs and a set of MCSs based at least in part on the first DCI message; and selecting one or more of a RI from the set of RIs or a MCS from the set of MCSs, based at least in part on one or more of the RI or the MCS satisfying a criterion, wherein the second CSI report comprises an indication of one or more of the MCS or the RI.

Aspect 6: The method of any of aspects 2 through 5, further comprising: determining a set of resource-block allocations based at least in part on the first DCI message; and selecting a resource-block allocation from the set of resource-block allocations, the resource-block allocation comprising one or more of a TDRA or a FDRA, wherein the second CSI report comprises an indication of the resource-block allocation.

Aspect 7: The method of any of aspects 2 through 6, further comprising: determining one or more of: a channel quality indicator, a MCS, a RI, a beam indicator, a L1-RSRP indicator, or a CSI reference signal resource indicator, based at least in part on the second DCI message, wherein the second CSI report includes one or more of: the channel quality indicator, the MCS indicator, the RI, the beam indicator, the L1-RSRP indicator, or the CSI reference signal resource indicator.

Aspect 8: The method of any of aspects 2 through 7, wherein the second CSI report includes the first set of transmission parameters and the second set of transmission parameters.

Aspect 9: The method of any of aspects 2 through 8, wherein the second CSI report includes a list of preferred transmission parameters associated with the second set of transmission parameters, the second set of transmission parameters comprising one or more of a DMRS configuration, a MCS, a RI, a TDRA, or a resource-block allocation.

Aspect 10: The method of any of aspects 2 through 9, wherein the second UCI message excludes the second CSI report based at least in part on a CSI report field in the second DCI message indicating that CSI reporting is disabled.

Aspect 11: The method of any of aspects 1 through 10, further comprising: receiving a semi-static control message comprising an indication of a transmission configuration, the semi-static control message comprising a radio resource control message or a medium access control-control element message, the transmission configuration comprising one or more of the first set of transmission parameters or the second set of transmission parameters.

Aspect 12: The method of aspect 11, further comprising: selecting a resource-block allocation of a set of resource-block allocations based at least in part on a bitmap in the semi-static control message, one or more of the first set of transmission parameters or the second set of transmission parameters being associated with the resource-block allocation, wherein communicating with the base station is based at least in part on the resource-block allocation.

Aspect 13: The method of any of aspects 11 through 12, further comprising: determining first timing information based at least in part on the semi-static control message or the first DCI message, the first timing information comprising one or more of an ending symbol associated with the first DCI message in a time-domain, or a duration between the ending symbol associated with the first DCI message and a beginning symbol associated with the first UCI message in the time-domain, wherein transmitting the first UCI message on the first uplink control channel is based at least in part on the first timing information.

Aspect 14: The method of aspect 13, further comprising: determining second timing information based at least in part on the semi-static control message or the first DCI message, the second timing information comprising one or more of a beginning symbol associated with a CSI and interference measurement resource, or a duration between the beginning symbol associated with the CSI and interference measurement resource and the beginning symbol associated with the first UCI message in the time-domain, wherein transmitting the first UCI message on the first uplink control channel is based at least in part on the first timing information and the second timing information.

Aspect 15: The method of aspect 14, wherein the transmission configuration comprises a TDRA configuration comprising one or more of the first timing information or the second timing information.

Aspect 16: The method of any of aspects 1 through 15, wherein the first feedback comprises an indication of a result of a decoding operation on the first DCI message.

Aspect 17: The method of aspect 16, wherein receiving the second DCI message on the second downlink control channel is based at least in part on the result of the decoding operation on the first DCI message.

Aspect 18: The method of any of aspects 1 through 17, further comprising: determining an uplink control channel resource identifier based at least in part on the first DCI message; and determining one or more of: a beginning symbol associated with the first UCI message, a number of symbols associated with the first UCI message, a starting resource block associated with the first UCI message, or a number of resources blocks associated with the first UCI message, wherein transmitting the first UCI message on the first uplink control channel is based at least in part on one or more of: the beginning symbol associated with the first UCI message, the number of symbols associated with the first UCI message, the starting resource block associated with the first UCI message, or the number of resources blocks associated with the first UCI message.

Aspect 19: The method of any of aspects 1 through 18, further comprising: determining an offset in a time-domain between an ending symbol associated with the first DCI message and a beginning symbol associated with the first UCI message; and determining one or more resources to transmit the first UCI message based at least in part on determining the offset in the time-domain, wherein transmitting the first UCI message on the first uplink control channel is based at least in part on determining the one or more resources.

Aspect 20: The method of any of aspects 1 through 19, further comprising: determining one or more of: a search space associated with the second DCI message, an aggregation level associated with the second DCI message, or a downlink control channel candidate associated with the second DCI message, based at least in part on the first DCI message, wherein receiving the second DCI message is based at least in part on one or more of the search space associated with the second DCI message, the aggregation level associated with the second DCI message, or the downlink control channel candidate associated with the second DCI message.

Aspect 21: The method of any of aspects 1 through 20, further comprising: receiving a third DCI message on a third downlink control channel based at least in part on one or more of the first UCI message or transmitting a second UCI message in response to the second DCI message, the third DCI message comprising a third set of transmission parameters different than the first set of transmission parameters or the second set of transmission parameters, or both, wherein communicating with the base station is based at last in part on the third DCI message.

Aspect 22: The method of any of aspects 1 through 21, wherein communicating with the base station comprises: receiving a downlink data transmission on a downlink data channel based at least in part on the second set of parameters.

Aspect 23: A method for wireless communication at a base station, comprising: transmitting a first DCI message on a first downlink control channel, the first DCI message comprising a first set of transmission parameters; receiving a first UCI message on a first uplink control channel based at least in part on the first DCI message, the first UCI message comprising a first feedback and a first CSI report; transmitting a second DCI message on a second downlink control channel based at least in part on the first UCI message, the second DCI message comprising a second set of transmission parameters different than the first set of transmission parameters; and communicating with a UE based at least in part on the second set of transmission parameters.

Aspect 24: The method of aspect 23, further comprising: receiving a second UCI message on a second uplink control channel, the second UCI message comprising one or more of a second feedback or a second CSI report, wherein communicating with the UE is based at least in part on the second UCI message.

Aspect 25: The method of aspect 24, wherein receiving the second UCI message comprising one or more of the second feedback or the second CSI report is based at least in part on a CSI report field in the second DCI message indicating that CSI reporting is enabled.

Aspect 26: The method of any of aspects 24 through 25, wherein the second CSI report includes the first set of transmission parameters and the second set of transmission parameters.

Aspect 27: The method of any of aspects 24 through 26, wherein the second CSI report includes a list of preferred transmission parameters associated with the second set of transmission parameters, the second set of transmission parameters comprising one or more of a DMRS configuration, a MCS, a RI, a TDRA, or a resource-block allocation.

Aspect 28: The method of any of aspects 23 through 27, further comprising: transmitting a semi-static control message comprising an indication of a transmission configuration, the semi-static control message comprising a radio resource control message or a medium access control-control element message, the transmission configuration comprising one or more of the first set of transmission parameters or the second set of transmission parameters, wherein communicating with the UE is based at least in part on the semi-static control message.

Aspect 29: An apparatus for wireless communication at a UE, comprising a processor; memory coupled with the processor; and instructions stored in the memory and executable by the processor to cause the apparatus to perform a method of any of aspects 1 through 22.

Aspect 30: An apparatus for wireless communication at a UE, comprising at least one means for performing a method of any of aspects 1 through 22.

Aspect 31: A non-transitory computer-readable medium storing code for wireless communication at a UE, the code comprising instructions executable by a processor to perform a method of any of aspects 1 through 22.

Aspect 32: An apparatus for wireless communication at a base station, comprising a processor; memory coupled with the processor; and instructions stored in the memory and executable by the processor to cause the apparatus to perform a method of any of aspects 23 through 28.

Aspect 33: An apparatus for wireless communication at a base station, comprising at least one means for performing a method of any of aspects 23 through 28.

Aspect 34: A non-transitory computer-readable medium storing code for wireless communication at a base station, the code comprising instructions executable by a processor to perform a method of any of aspects 23 through 28.

It should be noted that the methods described herein describe possible implementations, and that the operations may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc, in which disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example operation that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), or ascertaining. Also, "determining" can include receiving (such as receiving information) or accessing (such as accessing data in a memory). Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving a first downlink control information message that indicates a first set of transmission parameters, a set of uplink resources, and a set of downlink resources;
transmitting a first uplink control information message via the set of uplink resources indicated by the first downlink control information message, the first uplink control information message comprising feedback for decoding the first downlink control information message and a first channel state information report;

receiving a second downlink control information message via the set of downlink resources indicated by the first downlink control information message, the second downlink control information message indicating a second set of transmission parameters associated with the first channel state information report;

transmitting a second uplink control information message comprising one or more of a second feedback or a second channel state information report based at least in part on a channel state information field in the second downlink control information message indicating that channel state information reporting is enabled, the second uplink control information message different from the first uplink control information message; and communicating with a network entity using the second set of transmission parameters based at least in part on the second uplink control information message.

2. The method of claim 1, further comprising:

determining a set of demodulation reference signal configurations based at least in part on the first downlink control information message; and selecting a demodulation reference signal configuration from the set of demodulation reference signal configurations, wherein the second channel state information report comprises an indication of the demodulation reference signal configuration from the set of demodulation reference signal configurations.

3. The method of claim 1, further comprising:

determining a set of rank indicators and a set of modulation and coding schemes based at least in part on the first downlink control information message; and selecting one or more of a rank indicator from the set of rank indicators or a modulation and coding scheme from the set of modulation and coding schemes, based at least in part on one or more of the rank indicator or the modulation and coding scheme satisfying a criterion, wherein the second channel state information report comprises an indication of one or more of the modulation and coding scheme or the rank indicator.

4. The method of claim 1, further comprising:

determining a set of resource block allocations based at least in part on the first downlink control information message; and selecting a resource block allocation from the set of resource block allocations, the resource block allocation comprising one or more of a time-domain resource allocation or a frequency-domain resource allocation, wherein the second channel state information report comprises an indication of the resource block allocation.

5. The method of claim 1, further comprising determining one or more of: a channel quality indicator, a modulation and coding scheme, a rank indicator, a beam indicator, a layer one reference signal received power indicator, or a channel state information reference signal resource indicator, based at least in part on the second downlink control information message, wherein the second channel state information report includes one or more of: the channel quality indicator, the modulation and coding scheme, the rank indicator, the beam indicator, the layer one reference signal received power indicator, or the channel state information reference signal resource indicator.

6. The method of claim 1, wherein the second channel state information report includes the first set of transmission parameters and the second set of transmission parameters.

7. The method of claim 1, wherein the second channel state information report includes a list of preferred transmission parameters associated with the second set of transmission parameters, the second set of transmission parameters comprising one or more of a demodulation reference signal configuration, a modulation and coding scheme, a rank indicator, a time-domain resource allocation, or a resource block allocation.

8. The method of claim 1, wherein the second uplink control information message excludes the second channel state information report based at least in part on a channel state information report field in the second downlink control information message indicating that channel state information reporting is disabled.

9. The method of claim 1, further comprising receiving a semi-static control message comprising an indication of a transmission configuration, the semi-static control message comprising a radio resource control message or a medium access control-control element message, the transmission configuration comprising one or more of the first set of transmission parameters or the second set of transmission parameters.

10. The method of claim 9, further comprising selecting a resource block allocation of a set of resource block allocations based at least in part on a bitmap in the semi-static control message, one or more of the first set of transmission parameters or the second set of transmission parameters being associated with the resource block allocation, wherein communicating with the network entity is based at least in part on the resource block allocation.

11. The method of claim 9, further comprising determining first timing information based at least in part on the semi-static control message or the first downlink control information message, the first timing information comprising one or more of an ending symbol associated with the first downlink control information message in a time domain, or a duration between the ending symbol associated with the first downlink control information message and a beginning symbol associated with the first uplink control information message in the time domain, wherein transmitting the first uplink control information message is based at least in part on the first timing information.

12. The method of claim 11, further comprising determining second timing information based at least in part on the semi-static control message or the first downlink control information message, the second timing information comprising one or more of a beginning symbol associated with a channel state information and interference measurement resource, or a duration between the beginning symbol associated with the channel state information and interference measurement resource and the beginning symbol associated with the first uplink control information message in the time domain, wherein transmitting the first uplink control information message is based at least in part on the first timing information and the second timing information.

13. The method of claim 12, wherein the transmission configuration comprises a time domain resource allocation configuration comprising one or more of the first timing information or the second timing information.

14. The method of claim 1, wherein the feedback comprises an indication of a result of a decoding operation on the first downlink control information message.

15. The method of claim 14, wherein receiving the second downlink control information message is based at least in part on the result of the decoding operation on the first downlink control information message.

16. The method of claim 1, further comprising:
determining an uplink control channel resource identifier based at least in part on the first downlink control information message; and
determining one or more of: a beginning symbol associated with the first uplink control information message, a number of symbols associated with the first uplink control information message, a starting resource block associated with the first uplink control information message, or a number of resource blocks associated with the first uplink control information message, wherein transmitting the first uplink control information message is based at least in part on one or more of: the beginning symbol associated with the first uplink control information message, the number of symbols associated with the first uplink control information message, the starting resource block associated with the first uplink control information message, or the number of resource blocks associated with the first uplink control information message.

17. The method of claim 1, further comprising:
determining an offset in a time domain between an ending symbol associated with the first downlink control information message and a beginning symbol associated with the first uplink control information message; and
determining one or more resources to transmit the first uplink control information message based at least in part on determining the offset in the time domain, wherein transmitting the first uplink control information message is based at least in part on determining the one or more resources.

18. The method of claim 1, further comprising determining one or more of: a search space associated with the second downlink control information message, an aggregation level associated with the second downlink control information message, or a downlink control channel candidate associated with the second downlink control information message, based at least in part on the first downlink control information message, wherein receiving the second downlink control information message is based at least in part on one or more of the search space associated with the second downlink control information message, the aggregation level associated with the second downlink control information message, or the downlink control channel candidate associated with the second downlink control information message.

19. The method of claim 1, further comprising receiving a third downlink control information message on a third downlink control channel based at least in part on one or more of the first uplink control information message or transmitting a second uplink control information message in response to the second downlink control information message, the third downlink control information message comprising a third set of transmission parameters different than one or both of the first set of transmission parameters or the second set of transmission parameters, wherein communicating with the network entity is based at last in part on the third downlink control information message.

20. The method of claim 1, wherein communicating with the network entity comprises:
receiving a downlink data transmission on a downlink data channel based at least in part on the second set of transmission parameters.

21. A method for wireless communication at a network entity, comprising:

transmitting a first downlink control information message that indicates a first set of transmission parameters, a set of uplink resources, and a set of downlink resources;
receiving a first uplink control information message via the set of uplink resources indicated by the first downlink control information message, the first uplink control information message comprising feedback for decoding the first downlink control information message and a first channel state information report;
transmitting a second downlink control information message via the set of downlink resources indicated by the first downlink control information message, the second downlink control information message indicating a second set of transmission parameters associated with the first channel state information report;
receiving a second uplink control information message comprising one or more of a second feedback or a second channel state information report based at least in part on a channel state information field in the second downlink control information message indicating that channel state information reporting is enabled, the second uplink control information message different from the first uplink control information message; and
communicating with a user equipment (UE) using the second set of transmission parameters based at least in part on the second uplink control information message.

22. The method of claim 21, wherein the second channel state information report includes the first set of transmission parameters and the second set of transmission parameters.

23. The method of claim 21, wherein the second channel state information report includes a list of preferred transmission parameters associated with the second set of transmission parameters, the second set of transmission parameters comprising one or more of a demodulation reference signal configuration, a modulation and coding scheme, a rank indicator, a time-domain resource allocation, or a resource block allocation.

24. The method of claim 21, further comprising transmitting a semi-static control message comprising an indication of a transmission configuration, the semi-static control message comprising a radio resource control message or a medium access control-control element message, the transmission configuration comprising one or more of the first set of transmission parameters or the second set of transmission parameters, wherein communicating with the UE is based at least in part on the semi-static control message.

25. A user equipment (UE) for wireless communication, comprising:
one or more memories storing processor-executable code; and
one or more processors coupled with the one or more memories and individually or collectively operable to execute the code to cause the UE to:
receive a first downlink control information message that indicates a first set of transmission parameters, a set of uplink resources, and a set of downlink resources;
transmit a first uplink control information message via the set of uplink resources indicated by the first downlink control information message, the first uplink control information message comprising feedback for decoding the first downlink control information message and a first channel state information report;
receive a second downlink control information message via the set of downlink resources indicated by the first downlink control information message, the second downlink control information message indicating a second set of transmission parameters associated with the first channel state information report;

transmit a second uplink control information message comprising one or more of a second feedback or a second channel state information report based at least in part on a channel state information field in the second downlink control information message indicating that channel state information reporting is enabled, the second uplink control information message different from the first uplink control information message; and communicate with a network entity using the second set of transmission parameters based at least in part on the second uplink control information message.

26. A network entity for wireless communication, comprising:

one or more memories storing processor-executable code; and one or more processors coupled with the one or more memories and individually or collectively operable to execute the code to cause the network entity to:

transmit a first downlink control information message that indicates a first set of transmission parameters, a set of uplink resources, and a set of downlink resources;

receive a first uplink control information message via the set of uplink resources indicated by the first downlink control information message, the first uplink control information message comprising feedback for decoding the first downlink control information message and a first channel state information report;

transmit a second downlink control information message via the set of downlink resources indicated by the first downlink control information message, the second downlink control information message indicating a second set of transmission parameters associated with the first channel state information report;

receive a second uplink control information message comprising one or more of a second feedback or a second channel state information report based at least in part on a channel state information field in the second downlink control information message indicating that channel state information reporting is enabled, the second uplink control information message different from the first uplink control information message; and communicate with a user equipment (UE) using the second set of transmission parameters based at least in part on the second uplink control information message.

* * * * *